United States Patent [19]

Takahashi

[11] Patent Number: 5,440,364
[45] Date of Patent: Aug. 8, 1995

[54] FILM LOADER

[75] Inventor: Keita Takahashi, Hachioji, Japan

[73] Assignee: Olympus Optical Co., Ltd., Tokyo, Japan

[21] Appl. No.: 319,324

[22] Filed: Oct. 6, 1994

Related U.S. Application Data

[63] Continuation of Ser. No. 20,319, Feb. 19, 1993, abandoned.

[30] Foreign Application Priority Data

Feb. 19, 1992 [JP] Japan .................................. 4-032308

[51] Int. Cl.$^6$ .............................................. G03B 1/18
[52] U.S. Cl. ................................ 354/173.1; 354/212; 354/288
[58] Field of Search ................... 354/21, 173.1, 173.11, 354/174, 212, 215, 275, 276, 281, 288; 352/74; 358/906

[56] References Cited

U.S. PATENT DOCUMENTS 4,752,797  6/1988  Sekine et al. .......................... 354/212

FOREIGN PATENT DOCUMENTS 63-281142  11/1988  Japan .
10517  3/1990  Japan .
2-176739  7/1990  Japan .

Primary Examiner—Howard B. Blankenship
Attorney, Agent, or Firm—Louis Weinstein

[57] ABSTRACT

A film loader of the present invention is located in a camera body, and made up of a Patrone housing into which a Patrone is inserted along a direction of a film spool, and a leader housing that is formed as part of the Patrone housing and stores a film leader coming out of a Patrone. Herein, the Patrone housing and the leader housing can move freely between a storage position at which the Patrone housing and leader housing are stored in the camera body, and a projecting position at which the Patrone housing projects from a side face of the camera body and the leader housing projects from the rear face of the camera body.

48 Claims, 18 Drawing Sheets

FILM LOADER

This is a continuation of application Ser. No. 08/020,319, filed Feb. 19, 1993, now abandoned.

BACKGROUND OF THE INVENTION

1. Field of the Invention

The present invention relates to a film loader, or more particularly, to a film loader for such type of camera that performs photography with Patrone-cased film loaded.

2. Description of the Related Art

In a camera that performs photography using Patrone-cased film, the inner circumferential surface of a Patrone chamber in which a Patrone is loaded has, in general, been shaped like the outer circumferential surface of the Patrone in the past. The Patrone chamber, for example, is formed on the rear lateral side in a camera body, and shielded with a back cover.

FIG. 25 shows an example of the above auto-loading type camera, which is an oblique view looking at the camera from above and behind the camera.

The camera has a lens 304 in substantially the center of the front of a camera body 311. In the camera body 311, an aperture 311c is formed behind the lens 304 along the optical axis thereof. A Patrone chamber 311a that accommodates a Patrone 7 is formed at the right of the aperture 311c, and a spool chamber 311d having a spool 312 for taking up film 8 is formed at the left of the aperture 311c. One end of the camera body 311 on the side of the spool chamber 311d has a hinge (not shown) with which a back cover 314 is hinged to be rotatable. The back cover 314 extends from the spool chamber 311d to the Patrone chamber 311a in order to tightly intercept light.

To load film into the above type of camera, first, an operating member 315 located on the side face of the camera body 311 must be operated to disengage a key 316 on the camera body 311 from a key 314a on the back cover 314. Then, the back cover 314 is opened. Then, the Patrone 7 is loaded into the Patrone chamber 311a in an arrow-C direction in FIG. 25. After the distal end of the film 8 is aligned, the back cover 314 is closed in an arrow-D direction in FIG. 25. Consequently, the film 8 is automatically wound around the spool 312.

In a camera recently proposed in Japanese Utility Model Examined Publication No. 1990-10517, a Patrone chamber is slided substantially vertically with respect to the optical axis of a lens and moved to a Patrone loading position, and then a Patrone is loaded in the axial direction thereof.

In a camera proposed in Japanese Patent Laid-Open No. 1988-281142, the open or close operation of a back cover is motor-driven.

As a technical means for sliding a Patrone chamber substantially vertically with respect to the optical axis of a lens, moving the Patrone chamber to a Patrone loading position, and loading a Patrone in the axial direction thereof, which has been disclosed in Japanese Patent Laid-Open No. 1990-176739, a notch is formed in part of the Patrone chamber to improve film loading efficiency.

In the aforesaid conventional construction, when film is to be loaded, a camera is usually positioned with its lens side facing down and with its back cover open. In this state, the film is usually loaded or unloaded. When a camera is fixed to a tripod, however, loading or unloading film is quite a bother.

In recent years, zoom lenses have taken over normal lenses. More and more cameras are having relatively long lens barrels. Therefore, when a camera is placed with its lens side facing down in order to load film, since the camera is quite unstable, the camera sometimes falls down. Besides, excess force is applied to a lens or a barrel, causing the lens or barrel to break.

For overcoming the foregoing drawbacks, a method such as the one described in Japanese Utility Model Examined Publication No. 1990-10517 is thinkable; that is, a Patrone chamber is slided substantially vertically with respect to the optical axis of a lens and moved to a Patrone loading position, and then the Patrone is loaded in the axial direction thereof.

However, the length of a film leader that has already been pulled out of a Patrone to be loaded varies depending on a film manufacturer. In some types of film, a long portion of film has already been pulled out. According to the method described in the above examined publication, a quantity of sliding a Patrone chamber must be large. This leads to an increase in the size of a guide for assisting the Patrone chamber in sliding. Eventually, a camera becomes large.

In a camera based on a quick-loading system, a Patrone loading chamber is locked in the camera. A display operation member is installed in the upper part of the chamber. An aperture through which a Patrone is loaded is usually formed on the bottom of the camera. When the camera is fixed to a tripod, it becomes impossible to replace film.

Furthermore, in a camera having the foregoing conventional construction, the open or close operation of a back cover is not automated. This sometimes leads to an accident that the back cover is opened with film loaded to destroy the exposed invaluable film. The above Japanese Patent Laid-Open No. 1988-281142 does not comment on this problem and may pose a similar drawback.

On the other hand, in a technical means disclosed in the above Japanese Patent Laid-Open No. 1990-176739, a Patrone chamber is structured to be deep in the axial direction of a Patrone. This makes it difficult to extract film from the Patrone chamber. As a solution of this problem, the technical means has a notch in the Patrone chamber. The notch is formed only on one side of the Patrone chamber, leaving a problem that a Patrone is still hard to extract.

OBJECTS AND SUMMARY OF THE INVENTION

The first object of the present invention is to provide a film loader that permits easy loading of film encased in a Patrone into a camera body and will not be large in size.

The second object of the present invention is to provide a film loader capable of preventing an accident that a Patrone is taken out with film not encased in the Patrone.

The third object of the present invention is to provide a film loader permitting easy removal of a Patrone.

The fourth object of the present invention is to provide a film loader permitting easy take-out of a Patrone even if a finger tilts naturally when a Patrone is taken out.

The fifth object of the present invention is to provide a film loader permitting easy loading of a film leader.

The sixth object of the present invention is to provide a film loader enabling fine alignment of a mask means.

The seventh object of the present invention is to provide a film loader permitting easy indication of start of movement of a Patrone housing and a leader housing.

The eighth object of the present invention is to provide a camera having a film loader that can detect a precise position of a film loading member.

The ninth object of the present invention is to provide a camera having a film loader that can hold a film loading member reliably in a camera body and release the hold.

The tenth object of the present invention is to provide a camera having a film loader that can prevent an event that when a film loading member is pressed with, for example, a hand, an epicyclic gear revolves to disable subsequent operations.

The eleventh object of the present invention is to provide a camera having a film loader that can transmit driving force of a single electric driving means into a plurality of means to be driven.

The twelfth object of the present invention is to provide a camera having a film loader that can drive a mirror, charge a shutter, and rewind film using a single electric driving means.

The thirteenth object of the present invention is to provide a film loader for a camera that can move a film loading section to a Patrone take-out position without any manipulation.

The fourteenth object of the present invention is to provide a film loader for a camera that can move a film loading means to a Patrone take-out position or to a Patrone storage position without any manipulation.

The fifteenth object of the present invention is to provide a camera capable of releasing a locking means for preventing a film loading opening means from opening without any manipulation.

Briefly, a film loader of the present invention comprises a Patrone housing that moves freely between a storage position at which the Patrone housing is stored in a camera body and a projecting position at which the Patrone housing projects from a side face of the camera body and a Patrone can be inserted therein, and a leader housing that is formed as part of the Patrone housing and moves between the storage position at which the leader housing is stored in the camera body and a projecting position at which the leader housing projects from the rear face of the camera body and can store a film leader pulled out of the Patrone.

The above, as well as other objects and advantages of the present invention will be further apparent from the detailed explanation below.

DETAILED DESCRIPTION OF THE PREFERRED EMBODIMENTS

Embodiments of the present invention will be described with reference to the drawings.

Figure 1:
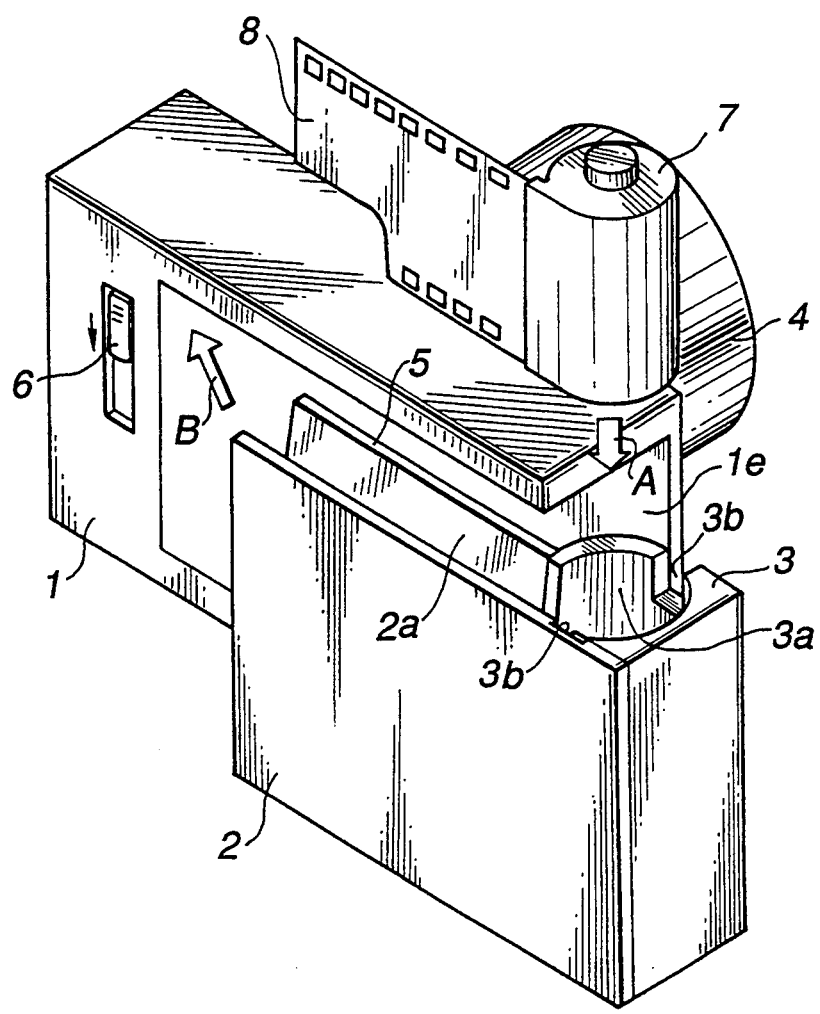
FIG. 1 is an oblique view of a film loader representing a first embodiment of the present invention.

FIG. 1 is an oblique view of a film loader representing the first embodiment of the present invention, viewing the film loader from behind. FIG. 1 is helpful to show the manner in which a Patrone is placed in the film loader and the manner of mounting the film loader in a camera to which the film loader applies.

Figure 5:
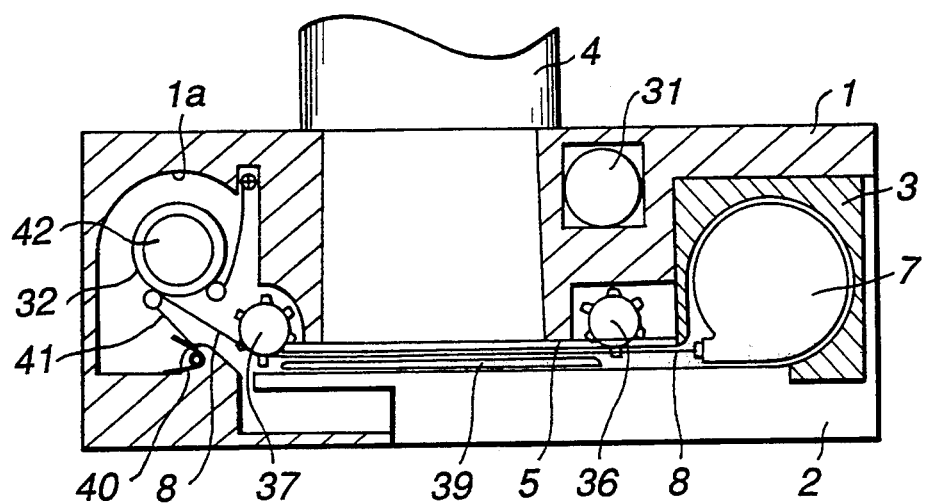
FIG. 5 is a central cross-sectional view of a camera in which the Patrone loader of the first embodiment is mounted in a camera body.
Figure 6:
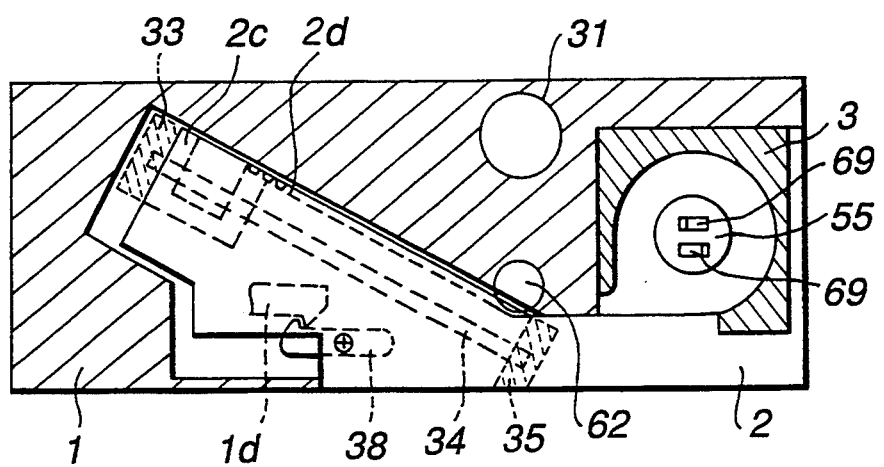
FIG. 6 is a lower cross-sectional view of a camera in which the Patrone loader of the first embodiment is mounted in a camera body.

FIGS. 5 and 6 are central and lower cross-sectional views of the camera, viewing the camera from above.

The camera has a lens 4 on the front of a camera body 1 and possesses normal photographic functions.

On the back of the camera body 1, an insertion opening 1e is formed over the back through a side face. A Patrone loader 2 is inserted in the insertion opening 1e. The Patrone loader 2 forms part of a film loader. The other portions of the film loader are also located in the camera body 1.

The Patrone loader 2 includes a Patrone holder 3 having an opening 3a through which a Patrone 7 with film 8 encased can be inserted in the axial direction of a spool in the Patrone 7, and a space 2a that accommodates a leader of the film 8 and plays a role of a guide.

The Patrone loader 2 is supported by a guide axis 34 (See FIG. 6), and constructed so that the Patrone holder 3 can be slided to a position at which the Patrone holder 3 will project obliquely behind one side face of the camera body 1.

In the Patrone holder 3, notches 3b are formed to lie at two opposed positions on the opening 3a through which a Patrone is inserted, permitting easy removal of the Patrone.

The Patrone loader 2 includes a mask member 5 made up of a rail 5b (See FIG. 7) for guiding a leader of film 8, a pressure plate 39 (See FIG. 5) for ensuring flatness for the film 8, a pressure plate rail 5a (See FIG. 7) that is in contact with the pressure plate 39 and reserves a space, through which the film 8 passes, between the film rail and pressure plate 39, and an aperture 5d for determining a picture size. When the Patrone loader 2 moves to a Patrone loading position to be described later, a space 2a between the mask member 5 and the Patrone loader 2 widens to provide a film loading space, which allows the leader of the film 8 to slide into a film passage. On the other hand, when the Patrone holder 3 is stored in the camera, the space 2a narrows to provide a film feeding space. Thus, the mask member 5 is attached to the Patrone loader 2 so as to be pivotable.

Between the Patrone holder 3 and the lens 4, a motor 31 is installed as shown in FIGS. 5 and 6. An output of the motor 31 is transmitted selectively to a mirror driving mechanism and a shutter charging mechanism (not shown), to the Patrone loader 2, or to a rewind pawl 69 that engages with a spool in a Patrone via a clutching mechanism (not shown). A spool 32 and a spool chamber 1a are formed on the opposite side of the Patrone holder 3 with respect to the optical axis of the lens 4. Across the aperture 5d, sprockets 36 and 37 are supported by the camera body 1 so as to be rotatable.

A guide member 41 is attached to the camera body so that film 8 will be wound around the spool 32 reliably. The guide member 41 is pressed by a pressing spring 40, thus pushing the film 8 against the spool 32.

In the spool 32, a motor 42 is arranged so as to be coaxial with the spool 32. An output of the motor 42 is transmitted selectively to the spool 32, or to the sprocket 36 or 37 via the clutching mechanism.

In the back area of the Patrone loader 2, a key 38 (See FIG. 6) is attached to couple the Patrone loader 2 with the camera body 1 when the Patrone loader 2 is stored in the camera.

Figure 7:
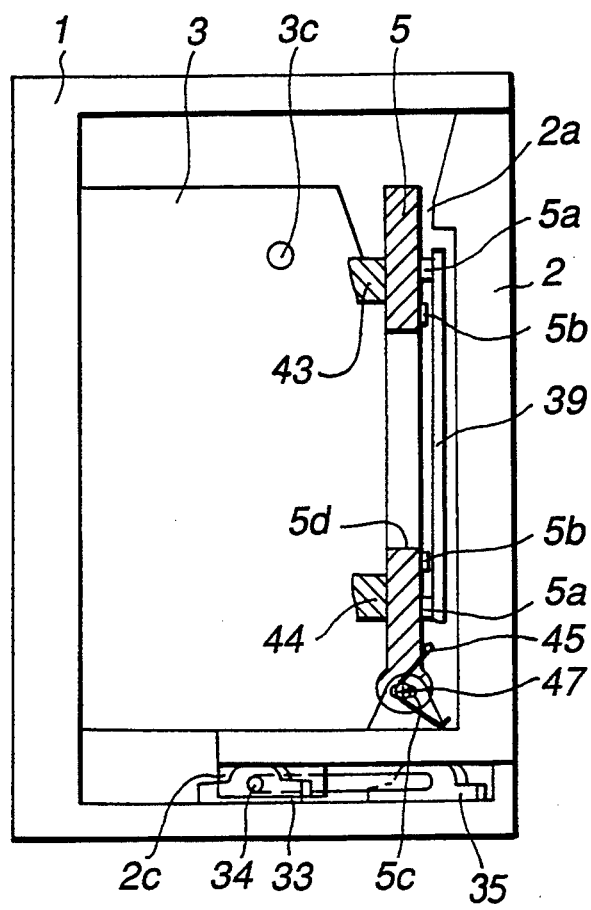
FIG. 7 is a side cross-sectional view of a camera body in which the Patrone loader of the first embodiment is stored, viewing the camera body from the left.
Figure 8:
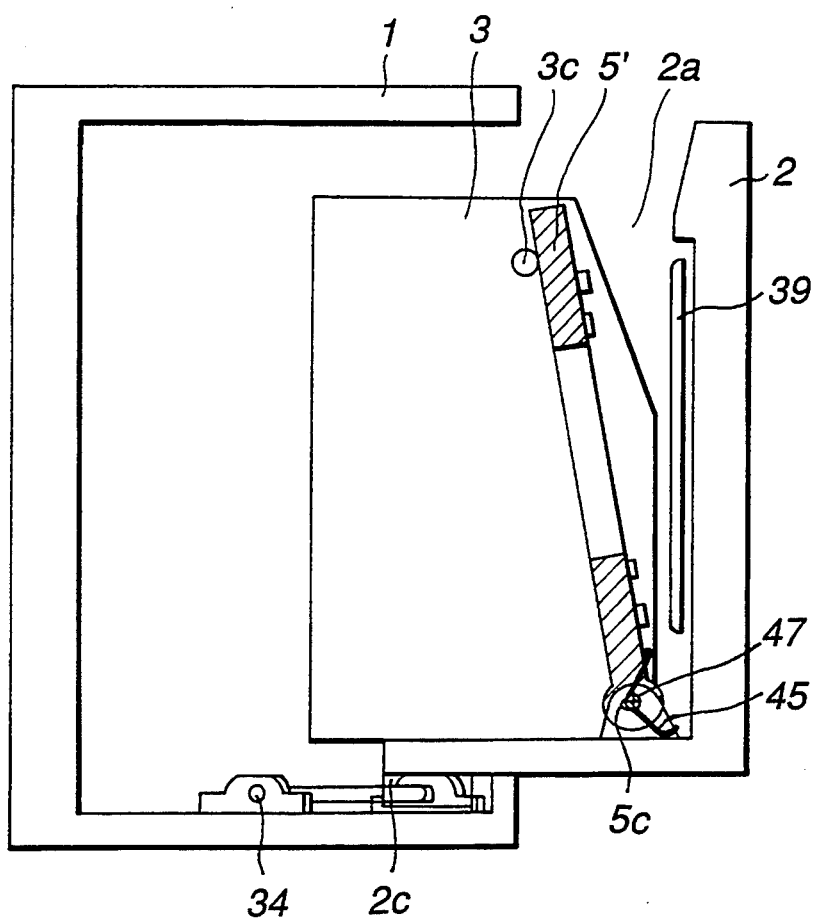
FIG. 8 is a side cross-sectional view of the Patrone loader of the first embodiment which is dismounted from a camera body and set at a Patrone loading position for loading a Patrone, viewing the Patrone loader from the left.

FIGS. 7 and 8 are side cross-sectional views, looking at a camera body 1 from the left. FIG. 7 shows the state of a Patrone loader 2 at a storage position in which the Patrone loader 2 has been stored in the camera body. FIG. 8 shows the state of the Patrone loader 2 at a Patrone loading position in which the Patrone loader 2 has been dismounted from the camera body and a Patrone is about to be inserted.

Figure 9:
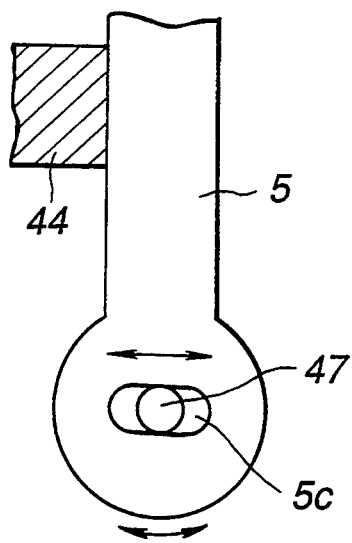
FIG. 9 is an enlarged side view showing the rotary section of a mask in the first embodiment.

A mask member 5 has, as shown in FIG. 9, an elongated hole 5c in the lowest area, and can pivot about an axis 47 fixed to the bottom 2c of the Patrone loader 2 as a rotation center. Since the elongated hole 5c is elongated back and forth, the mask member 5 can also move back and forth. This enables alignment of the mask member 5. The mask member 5 is pressed toward departing from the Patrone loader 2 by means of a torsion spring 45. On one side face of a Patrone holder 3, a stopper 3c is formed to restrict rotation of the mask member 5 around the axis 47. The Patrone loader 2 is provided with a pressure plate 39 that is pressed to push film 8 toward the front side of the camera body 1.

When the Patrone loader 2 is at a storage position, the mask member 5 is pushed against rails 43 and 44 laid on the camera body 1 via a pressure plate rail section 5a by a pressure plate 39. Thereby, the film 8 is aligned correctly.

Next, when the Patrone loader 2 is dismounted from the camera body and moved to a specified Patrone loading position so that a Patrone 7 (See FIG. 1) can be put in the Patrone loader 2, as shown in FIG. 8, the mask member 5 rotates with the axis 47 as a center due to the pressing force of the torsion spring 45 until the mask member 5 gets in touch with a stopper 3c (position 5' in FIG. 8). Thereby, a space 2a between the mask member 5 and the Patrone loader 2 widens to provide a space for loading film. This allows the distal end of the film 8 to slide between the mask member 5 and the pressure plate 39, which clamp a film during photography.

Next, the driving mechanism of a Patrone loader 2 will be described.

Figure 10:
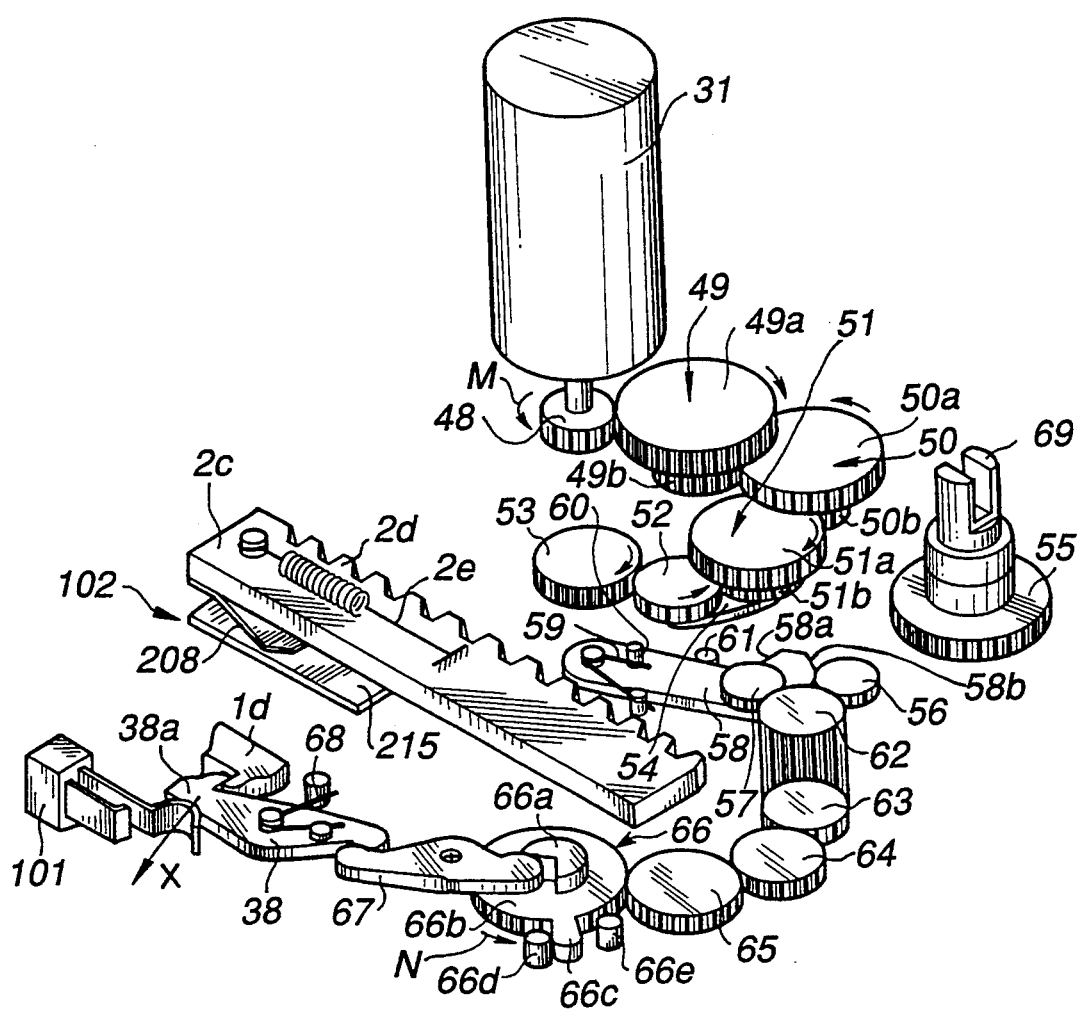
FIG. 10 is an oblique perspective view showing a gear array for the film loader in the first embodiment.

FIG. 10 is an oblique perspective view showing a gear array of the Patrone loader 2.

A motor 31 is fixed to a base T (not shown) that is locked in a camera body 1. A pinion gear 48 is fixed to the output axis of the motor 31 so that the pinion gear 48 will rotate as part of the output axis. A two-speed gear 49 is supported by the base T so as to be rotatable and a large-diameter gear 49a is engaging with the pinion gear 48. A two-speed gear 50 is supported by the base T so as to be rotatable and a large-diameter gear 50a is engaging with a small-diameter gear 49b.

A two-speed gear 51 is supported by the base T so as to be rotatable and a large-diameter gear 51a is engaging with a small-diameter gear 50b. Then, a small-diameter gear of the two-speed gear 51 serves as a sun gear 51b.

An epicyclic lever 54 is supported by the base T so that the epicyclic lever 54 can rotate coaxially with the two-speed gear 51. A gear 52 is supported by the epicyclic lever 54 so as to be rotatable. The sun gear 51b and epicyclic gear 52 engage with each other. A frictional member (not shown) is placed between the epicyclic lever 54 and epicyclic (i.e. planet) gear 52. Frictional force generated by the frictional member causes the epicyclic gear 52 to revolve depending on the direction in which the sun gear 51b rotates.

A gear 53 is supported by the base T so as to be rotatable. When the pinion gear 48 rotates in an arrow-M direction in FIG. 10, the epicyclic gear 52 revolves.

This causes the gear 53 to engage with the epicyclic gear 52. An output of the gear 53 is transmitted to a mirror driving mechanism and a shutter charging mechanism (not shown).

A gear 55 is supported by the bottom of a Patrone holder 3 so as to be rotatable. A bifurcated pawl member 69, which engages with a sprocket in a Patrone P, is fixed to the gear 55 so that the pawl member 69 will rotate as part of the gear 55. When the pinion gear 48 rotates in the opposite direction of the arrow-M direction in FIG. 10, the epicyclic gear 52 revolves, causing the gear 55 to engage with the epicyclic gear 52.

A gear 56 and a gear 57 are supported by the base T so as to be rotatable, so that the gears 56 and 57 will engage with the epicyclic gear 52 while the epicyclic gear 52 is revolving between the gear 53 and the gear 55.

A lever 58 is supported by the base T so as to be pivotable. The lever 58 is pressed toward the epicyclic lever 54 by means of a torsion spring 59, and abutting on a stopper 61. The lever 58 is provided with stopping sections 58a and 58b for stopping the epicyclic lever 54. The stopping section 58a is designed to stop the epicyclic lever 54 at a position at which the gear 57 and the epicyclic gear 52 engage with each other when the epicyclic gear 52 revolves due to the rotation of the pinion gear 48 in the opposite direction of the arrow-M direction. On the other hand, the stopping section 58b is designed to stop the epicyclic lever 54 at a position at which the gear 56 and the epicyclic gear 52 engage with each other when the epicyclic gear 52 revolves due to the rotation of the pinion gear 48 in the arrow-M direction.

A gear 62 is supported by the base T so as to be rotatable, and engaging both of the gears 56 and 57.

A gear 63 is supported by the base T so as to be rotatable, and engaging with the gear 62.

A gear 64 is supported by the Patrone loader 2 so as to be rotatable, and engaging with the gear 63.

A gear 65 is supported by the Patrone loader 2 so as to be rotatable, and engaging with the gear 64.

A gear 66 is supported by the Patrone loader 2 so as to be rotatable, and a gear section 66b thereof is engaging with the gear 65. The gear 66 has a cam 66a. An integral projection 66c projects from part of the gear section 66b. The rotation of the gear 66 is restricted by stoppers 66d and 66e formed on the Patrone loader 2. Thus, the gear 66 can rotate only in an interval between these stoppers 66d and 66e.

A lever 67 is supported by the Patrone loader 2 so as to be pivotable. One end thereof is in contact with the cam surface of the cam 66a of the gear 66, and the other end is in contact with a key 38.

The key 38 is supported by the Patrone loader 2 so as to be pivotable. The key 38 is pressed by a torsion spring 68 so that a claw 38a thereof will engage with a claw 1d on the camera body 1. An end surface of the key 38 on the opposite side of the claw 38a with respect to the pivot center of the key 38 is, as described above, in contact with an end surface of the lever 67 on the opposite side of the other end of lever 67 that is in contact with the cam 66a. Thereby, when the gear 66 rotates in an arrow-N direction in FIG. 10, the key 38 is driven in an arrow-X direction in FIG. 10 via the lever 67 by means of the cam 66a. This disengages the claw 38a of the key 38 on the Patrone loader from the claw 1d on the camera body 1.

On the back of the key 38, a key switch 101 realized with, for example, a leaf switch is fixed to the Patrone loader 2. The key switch 101 changes its state from off to on when the key 38 pivots against the pressing force of the spring 68.

A rack 2d is formed on an side surface of a bottom 2c of the Patrone loader 2. When the Patrone loader 2 is at a storage position, the rack 2d does not engage with the gear 62. While the Patrone loader 2 is moving from the storage position to a Patrone loading position, the rack 2d engages with the gear 62.

The Patrone loader 2 is pressed by a spring 2e toward moving from the storage position to the Patrone loading position. When the key 38 is disengaged from the claw 1d on the camera body 1, the pressing force of the spring 2e causes the Patrone loader 2 to move a little from the storage position to the Patrone loading position. Thereby, the gear 62 and rack 2d engage with each other. Consequently, the power of the motor 31 is transmitted to the Patrone loader 2.

A Patrone loader position detection switch 102 (See FIG. 14) is made up of a conductive chip 208 attached to the bottom surface of the Patrone loader 2 and a substrate 215 attached to the camera body 1. The chip 208 slides on the substrate 215 with the movement of the Patrone loader 2.

Figure 11:
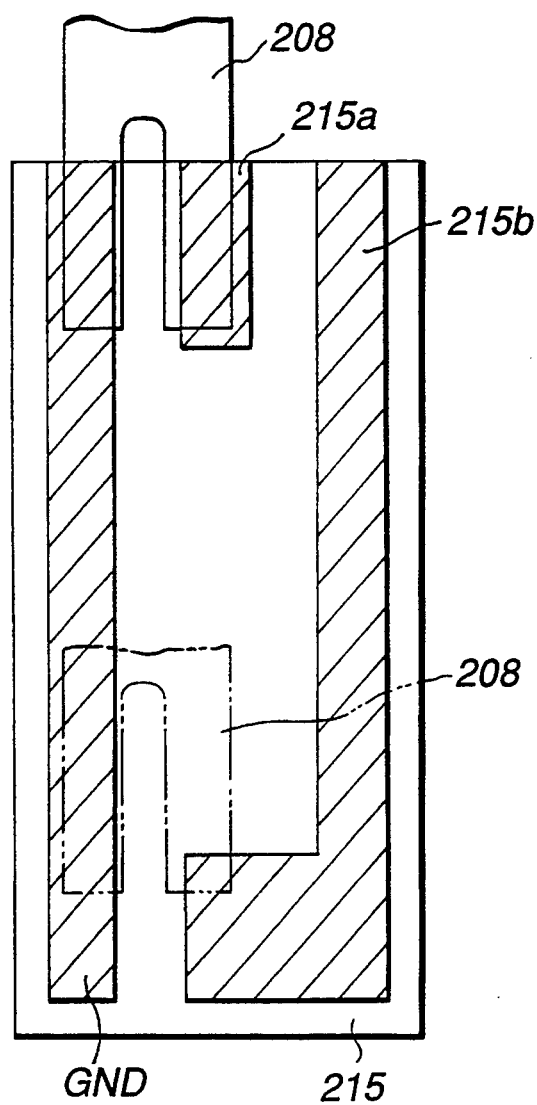
FIG. 11 is a plan view showing patterns on a substrate of a Patrone loader position detection switch in the first embodiment.

On the substrate 215, patterns shown as hatched areas in FIG. 11 are formed. The respective patterns are arranged so that it can be differentiated and detected whether the Patrone loader 2 is at the storage position or the Patrone loading position. Specifically, when the Patrone loader 2 is at the storage position, a ground pattern GND and a pattern 215a conduct mutually by means of the chip 208. When the Patrone loader 2 is at the Patrone loading position, the ground pattern GND and a pattern 215b conduct mutually by means of the chip 208 (when in the dotted position).

Next, a power transmission switching method using an epicyclic clutch will be described with reference to FIG. 12.

Figure 12:
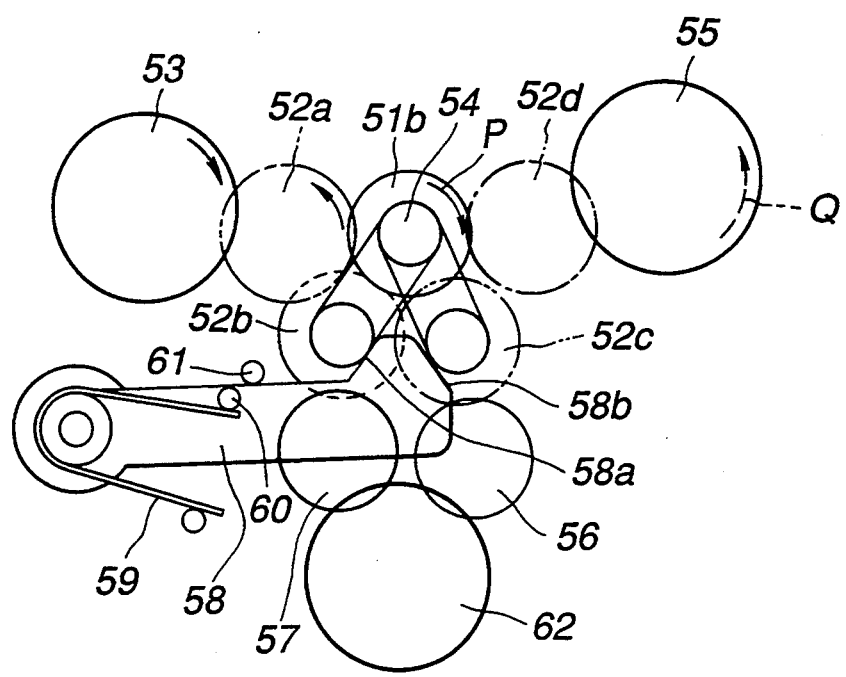
FIG. 12 is a plan view showing an epicyclic clutch switching mechanism in the gear array for the film loader shown in FIG. 10.

FIG. 12 is a plan view of an epicyclic clutch switching mechanism.

An epicyclic gear 52 is, as described above, supported by an epicyclic gear 54 via a frictional member, which is not shown, so as to be rotatable. The frictional force causes the epicyclic gear 52 to revolve depending on the direction in which a sun gear 51b rotates.

First of all, during normal photography, the sun gear 51b rotates in an arrow-P direction in FIG. 12. The epicyclic gear 52 revolves to move to a position indicated with alphanumeric characters 52a, and engages with a gear 53 to transmit the power of a motor 31 to the gear 53. An output of the gear 53 is transmitted to a mirror driving mechanism and to a shutter charging mechanism, which are not shown, via a transmitting mechanism which is not shown.

Next, when film exposure is completed, the motor 31 (See FIG. 10) is rotated in the opposite direction of the rotational direction during photography. Then, the sun gear 51b to rotates in the opposite direction of the arrow-P direction in FIG. 12. The rotation causes the epicyclic gear 52 to revolve from the position indicated with alphanumeric characters 52a to a position indicated with alphanumeric characters 52b at which the epicyclic lever 54 is stopped by a stopping section 58a of a lever 58. Thereby, the epicyclic gear 52 engages with a gear 57. At this time, power is transmitted sequentially from the gear 57 through a gear 62, a gear 63, a gear 64, and a gear 65 to a gear 66 (see FIG. 10). However, since the gear 66 is disabled to rotate by means of a stopper 66d, the gear 57 does not rotate.

Thus, the rotating force of the epicyclic gear 52 is converted into revolving force. As a result, the revolving force exceeds the pressing force of the lever 58. Then, the epicyclic lever 54 pushes through the lever 58, encouraging the epicyclic gear 52 to further revolve. Therefore, the epicyclic gear 52 revolves to a position indicated with alphanumeric characters 52d. Then, the epicyclic gear 52 engages with a gear 55. The gear 55 rotates in the direction of an arrow Q drawn with a dotted line. The rotation of the gear 55 causes a spool, which is engaged with a pawl member 69 in a Patrone, to rotate, thus rewinding film 8.

After rewind terminates, when an operation switch 6 (See FIG. 1) on the camera body 1 is operated, the motor 31 rotates in the opposite direction of the rewinding direction. This causes the sun gear 51b to rotate in the arrow-P direction in FIG. 12. With this rotation, the epicyclic gear 52 moves from the position indicated with alphanumeric characters 52d to a position indicated with alphanumeric characters 52c at which the epicyclic lever 54 is stopped by the stopping section 58b of the lever 58. Then, the epicyclic gear 52 engages with the gear 56. At this time, driving force is transmitted sequentially from the gear 56 through the gear 62, gear 63, gear 64, and gear 65 to the gear 66. Then, when the gear 66 rotates, the cam 66a rotates. A key 38 is driven against its pressing force via a lever 67 in a direction in which the key 38 will be disengaged from the claw 1d (See FIG. 10) on the camera body.

When the key is disengaged from the claw 1d, the pressing force of a spring 2e causes the Patrone loader 2 to move a little from the storage position to the Patrone loading position. Then, the gear 62 and gear 63 are disengaged from each other, the key 38 is reset with the pressing force to a state in which the key 38 can engage with the claw 1d. With the movement of the Patrone loader 2, a rack 2d and the gear 62 engage with each other. The rotation driving force of the motor 31 is transmitted to the Patrone loader 2. Thus, the driving force of the motor 31 causes the Patrone loader 2 to move to the Patrone loading position.

After the Patrone loader 2 moves to the Patrone loading position, when the movement is stopped by a stopper member (not shown), the gear 62 is disabled to rotate. Eventually, the gear 56 is also disabled to rotate. Then, the rotating force of the epicyclic gear 52 is converted into revolving force. As a result, the revolving force of the epicyclic gear 52 exceeds the pressing force of the lever 58. Then, the epicyclic lever 54 pushes through the lever 58, encouraging the epicyclic gear 52 to further revolve. Consequently, the epicyclic gear 52 moves to a position indicated with alphanumeric characters 52a and the motor 31 stops.

While the Patrone loader 2 is moving, if the Patrone loader 2 is pressed with, for example, a hand, the gear 62 is disabled to rotate. Therefore, the epicyclic gear 52 revolves and moves to the position indicated with alphanumeric characters 52a. The subsequent operations are disabled. To avoid this, while the Patrone loader 2 is moving, the effective voltage for driving the motor 31 is set to such a voltage value that disables the epicyclic lever 54 to push through the lever 58 and discourages the epicyclic gear 52 to revolve. That is to say, the motor 31 is driven with such a voltage that, when the completion of the movement of the Patrone loader 2 is detected, enables the epicyclic lever 54 to push through the lever 58 and encourages the epicyclic gear 52 to revolve.

Thereafter, when loading of film 8 is completed, the Patrone loader 2 is pushed ahead to the storage position. When the Patrone loader 2 is pushed ahead to the storage position, the key engages with the claw 1d. Then, the Patrone loader 2 is stopped at the storage position to start auto-loading.

Next, a film feed gear array will be described with reference to FIG. 13.

A motor 42 is locked on a base U which is not shown. A pinion gear 70 is fixed to an output axis of the motor 42 so that the pinion gear 70 will rotate as part of the output axis of the motor 42. A two-speed gear 71 is supported by the base U so as to be rotatable. A large-diameter gear 71a is engaging with the pinion gear 70. A two-speed gear 72 is supported by the base U so as to be rotatable. A large-diameter gear 72b is engaging with a small-diameter gear 71b.

A two-speed gear 73 is supported by the base U so as to be rotatable. A large-diameter gear 73a is engaging with a small-diameter gear 72a.

An epicyclic lever 75 is supported by the base U so as to be pivotable, which can rotate coaxially with the two-speed gear 73. The epicyclic lever 75 is supporting an epicyclic gear 74 so that the epicyclic gear 74 can rotate. A small-diameter gear 73b is engaging with the epicyclic gear 74. A frictional member (not shown) is placed between the epicyclic lever 75 and the epicyclic gear 74. The frictional force generated by the frictional member causes the epicyclic gear 74 to revolve depending on the direction in which the small-diameter gear 73b rotates.

A spool 32 for rewinding film 8, which is coaxial with the motor 42 and located on the outer circumference of the motor 42, is supported by the base U so as to be rotatable. A spool gear 32b is attached to the lower part of the spool 32. The revolution of the epicyclic gear 74 resulting from the rotation of the motor 42 in an arrow-Y direction in FIG. 13 causes the spool gear 32b to engage with the epicyclic gear 74. The spool 32 has claws 32a for hooking perforations of film during initial film wind.

A gear 77 is supported by the base U so as to be rotatable. With the revolution of the epicyclic gear 74 resulting from the rotation of the motor in the opposite direction of the arrow-Y direction in FIG. 13, the gear 77 engages with the epicyclic gear 74.

A sprocket 79 is supported by the camera body 1 so as to be rotatable, and provided with claws 79c and 79d, which engage with perforations of film, a gear 79a, and a gear 79b. The gear 79a engages with the gear 77.

A gear 80 is supported by the camera body 1 so as to be rotatable, and engaging with the gear 79b of the sprocket 79.

A gear 81 is supported by the camera body 1 so as to be rotatable, and engaging with the gear 80.

A gear 82 is supported by the camera body 1 so as to be rotatable, and engaging with the gear 81.

A gear 83 is supported by the camera body 1 so as to be rotatable, and engaging with the gear 82.

A gear 84 is supported by the camera body 1 so as to be rotatable, and engaging with the gear 83.

A sprocket 85 is supported by the camera body 1 so as to be rotatable, and provided with claws 85c, which engage with perforations of film, and a gear 85a. The gear 85a engages with the gear 84.

The gear 85a has the same number of teeth as the gear 79b so that the sprocket 85 will rotate synchronously with the sprocket 79. A phase difference between the claws 79c and 79d of the sprocket 79 and the claws 85c of the sprocket 85 is adjusted so that the claws 79c and 79d of the sprocket 79 and the claws 85c of the sprocket 85 will engage with perforations of film without causing mismatch.

A sprocket 89 is supported in such a manner that the sprocket 89 will be coaxial with the sprocket 85 and rotatable independently of the sprocket 85. The sprocket 89 is provided with claws 89a, which engage with perforations of a film, and a gear 89b. The sprocket 89 is constructed to rotate only with the movement of film 8.

A gear 86 is supported by the camera body 1 so as to be rotatable, and engaging with the gear 89b of the sprocket 89.

A gear 87 is supported by the camera body 1 so as to be rotatable, and a gear section 87a is engaging with the gear 86. The gear 87 has multiple slits 87b on its circumference. When the passages of the slits 87b are detected by a photo-interrupter 88 attached to the camera body 1, a pulse signal consisting of pulses generated in accordance with the movement of film 8 is supplied. Based on the pulse signal, feeding of film 8 is controlled.

Within in an interval along an orbit of revolution of the epicyclic gear 74 from the spool gear 32b to the gear 77, a fixed internal gear 76 is formed on the base U to engage with the epicyclic gear 74. When the epicyclic gear 74 is engaging with the spool gear 32 or the gear 77, the fixed internal gear 76 does not engage with the epicyclic gear 74. When the epicyclic gear 74 is switched over, the fixed internal gear 76 assists the epicyclic gear 74 in revolving. This ensures reliable switchover of the epicyclic gear 74. The fixed internal gear 76 is also intended to hold the epicyclic gear 74 so that the epicyclic gear 74 will not float at a neutral position at which the epicyclic gear 74 engages with neither the spool gear 32b nor the gear 77.

In a film passage, a film switch 110 is installed on the camera body 1. The film switch 110 is realized with a leaf switch. When film 8 is present in the film passage, the film switch 110 is turned on. When no film is present in the film passage, the film switch 110 is turned off.

Next, the operations of a film feed driving system will be described.

Figure 13:
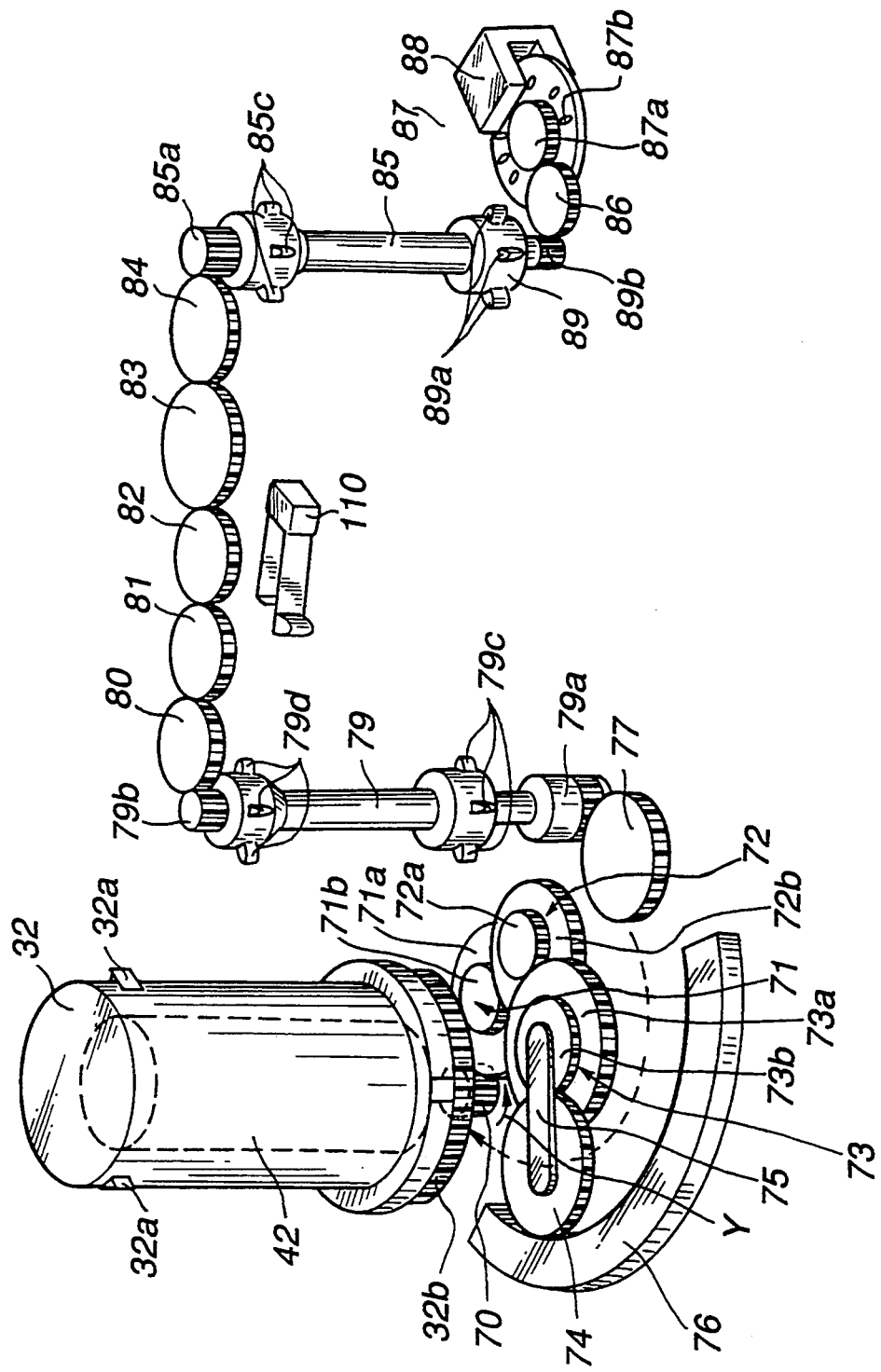
FIG. 13 is a perspective view showing a film feed gear array in the first embodiment.

First, when the movement of a Patrone loader 2 from a Patrone loading position to a storage position is detected, a motor 42 is rotated in the opposite direction of an arrow-Y direction in FIG. 13. Then, an epicyclic gear 74 revolves and moves to a position at which the epicyclic gear 74 engages with a gear 77. As a result, the rotation driving force of the motor 42 is transmitted from the gear 77 through a sprocket 79, a gear 80, a gear 81, a gear 82, a gear 83, and a gear 84, to a sprocket 85. Thus, initial feed of film 8 is achieved. The initial feed feeds the distal end of the film 8 to a position at which the distal end can wind about a spool 32.

A quantity of rotating a sprocket 89 is measured by counting output pulses of a photo-interrupter 88. When the count of output pulses comes to a certain value, the motor 42 is stopped.

Next, the motor 42 is rotated in the arrow-Y direction in FIG. 13. Then, the epicyclic gear 74 revolves and moves to a position at which the epicyclic gear 74 engages with a spool gear 32b. As a result, the rotation driving force of the motor 42 is transmitted to the spool 32. Then, initial wind of film 8 is executed. A quantity of feeding the film 8 at this time is detected as a quantity of rotating the sprocket 89, which is engaging with the perforations of the film 8, by counting output pulses of the photo-interrupter 88. When the count comes to a certain value, the motor 42 is braked to stop.

Thereafter, every time a frame is photographed, the motor 42 is rotated in the arrow-Y direction in FIG. 13. Thereby, the spool is driven to wind the film 8. At this time, although film wind for one frame is not completed, if the photo-interrupter 88 does not provide any output for a certain period of time, Film End is recognized. Then, the motor 42 is rotated a little in the opposite direction of the arrow-Y direction. Then, the epicyclic gear 74 is stopped at a position at which the epicyclic gear 74 does not engage with either the spool gear 32b or the gear 77 but engages with a fixed internal gear 76 formed on a base U. Thereby, the spool 32, sprocket 79, and sprocket 85 are decoupled from the motor 42 so as to minimize a load derived from film rewind.

Next, a motor 31 is driven to rewind film. Even at this time, output pulses of the photo-interrupter 88, which is interlocked with the rotation of the sprocket 89, are detected. When any output pulse has not been detected for a certain period of time, it is determined that film rewind terminates. Then, the drive of the motor 31 is stopped.

By the way, in this embodiment, notches 3b are formed to lie at two opposed positions on an opening 3a, through which a Patrone is inserted, in a Patrone holder 3. The notches 3b enables pickup of the Patrone and eventually permits effortless take-out of film 8.

Figure 19:
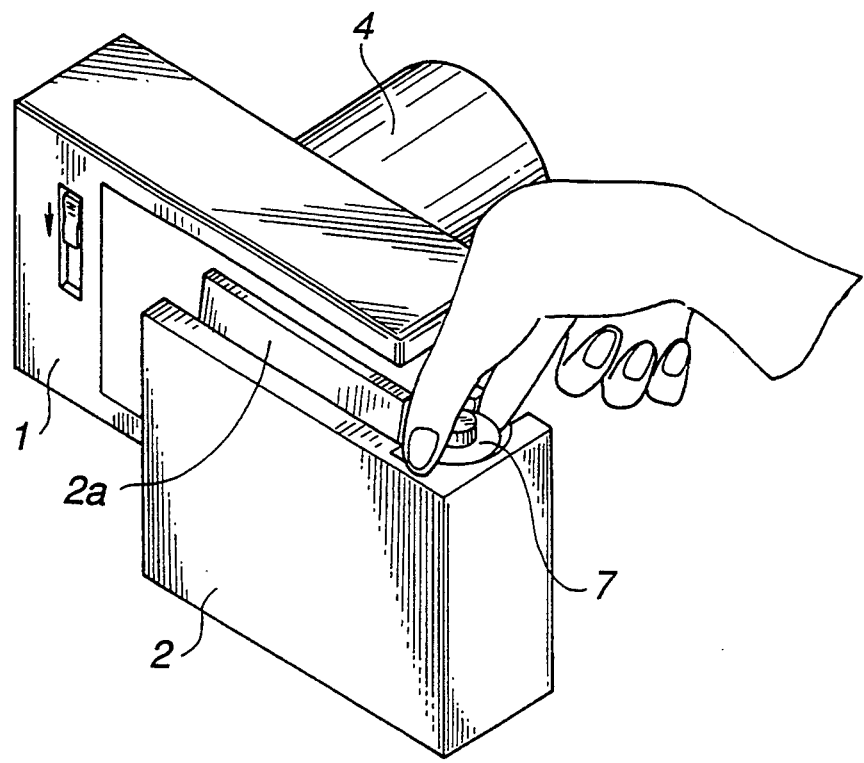
FIG. 19 is an oblique perspective view showing the manner in which a Patrone is put in a Patrone loader in the first embodiment.

In other words, for easy take-out of a Patrone, the notches 3b are formed to lie at two opposed positions on the opening 3a, through which a Patrone is inserted, in the Patrone holder 3. Each notch 3b is designed to have such a width and area that permits entry of a finger. Using the notches 3b, a Patrone can be picked up (See FIG. 19).

Figure 20:
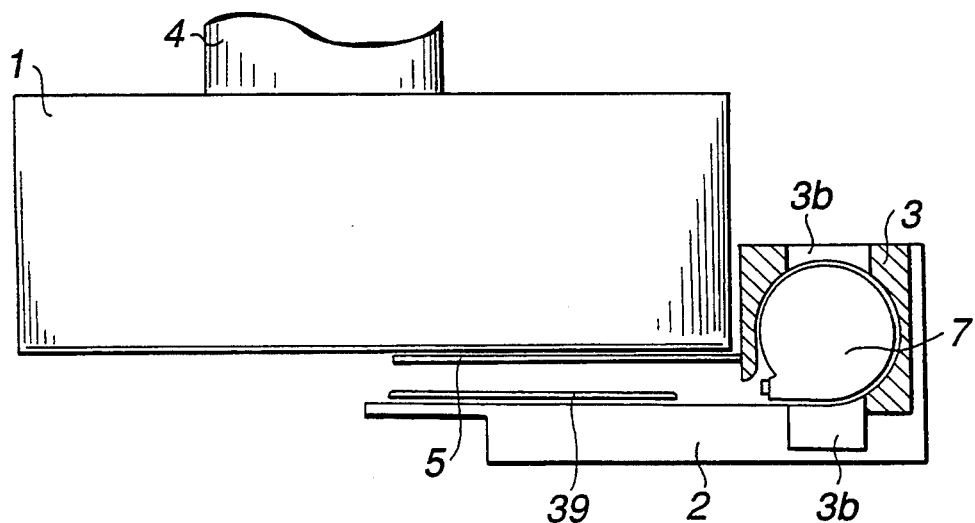
FIG. 20 is a plan cross-sectional view of notches of a Patrone loader in the first embodiment, viewing the notches from above.

FIG. 20 is a plan cross-sectional view, looking at the notches from above. As illustrated, each of the notches 3b has a smaller width than the diameter of a Patrone 7 but has a width permitting entry of a finger for picking up the Patrone 7.

Figure 21:
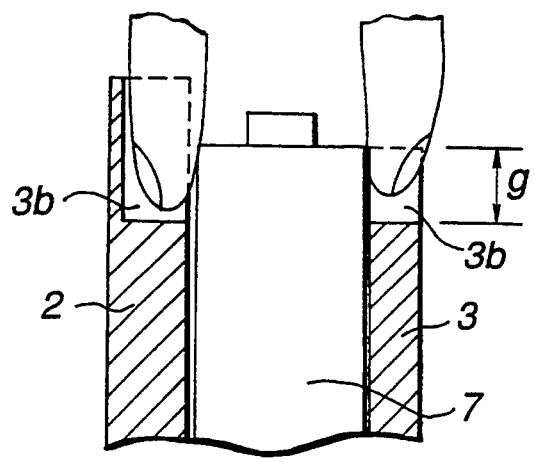
FIG. 21 is an enlarge-d side cross-sectional view of notches of a Patrone loader in the first embodiment.
Figure 22:
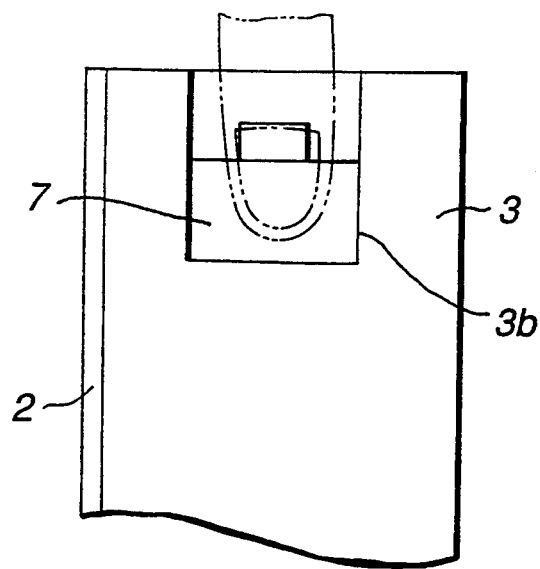
FIG. 22 is a front view of notches of a Patrone loader in the first embodiment.

FIGS. 21 and 22 are an enlarged side cross-sectional view of the notches 3b and a front view of the notches 3b respectively. As shown in FIGS. 21 and 22, each of the notches 3b is formed to have such a width, area, and depth that allows a finger to pick up the Patrone 7. One of the notches 3b on the front side along the optical axis of a lens is lowered by a depth indicated as g measured from the top of the shoulder of the Patrone 7.

Figure 23:
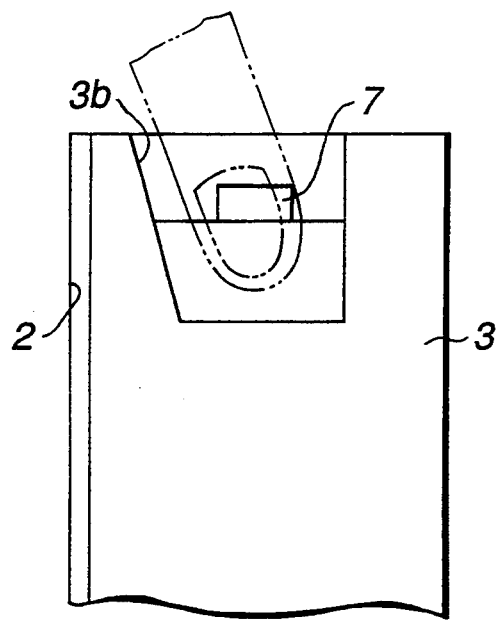
FIG. 23 is a front view showing the inclination of operator's fingers for loading a Patrone and other example of notches to cope with the inclination of the finger.

When an operator takes out film 8, as shown in FIG. 23, his/her fingers picking up the film 8 are likely to tilt. From this viewpoint, the notches 3b may be tapered as shown in FIG. 23. The notches 3b should be shaped optimally depending on positions at which the notches 3b will be arranged.

Figure 24:
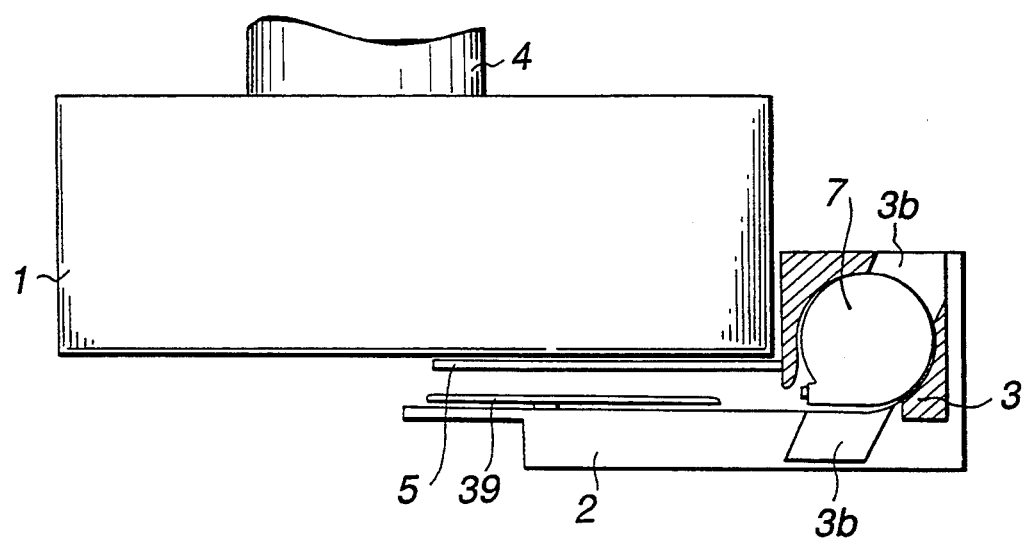
FIG. 24 is a plan cross-sectional view showing another example of notches of a Patrone loader in the first embodiment.
Figure 25:
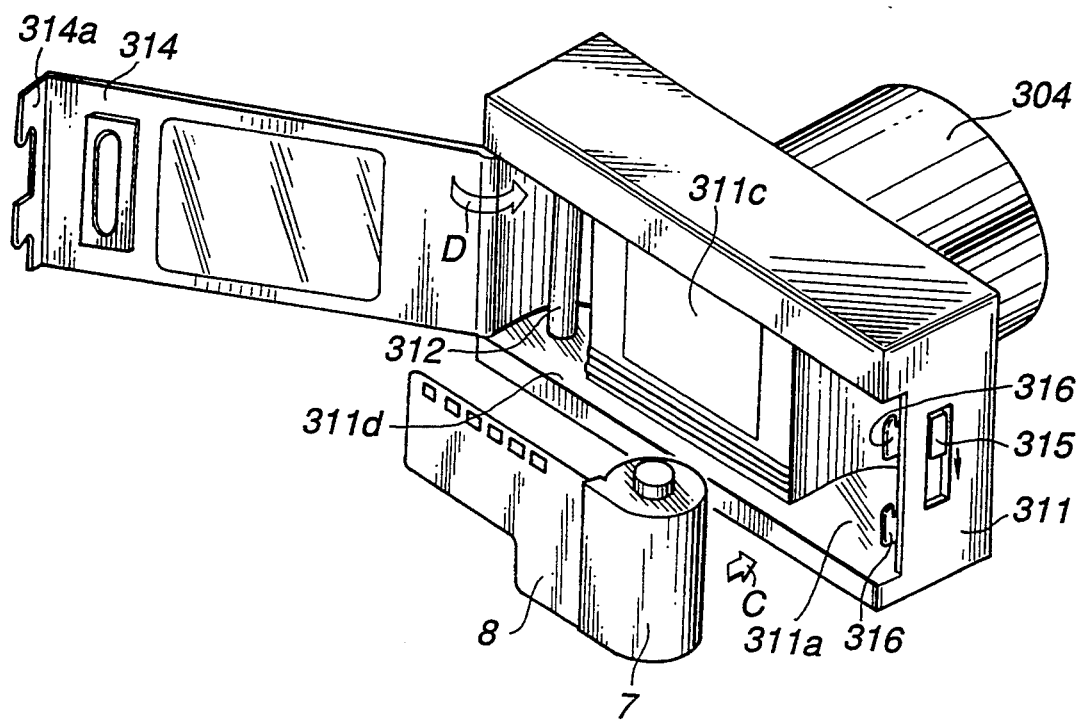
FIG. 25 is an oblique view of an example of a conventional auto-loading camera, viewing the example from above.

The positions of the notches 3b are not limited to those shown in FIG. 20. The notches 3b may be arranged at any optimal positions depending on the configuration of a camera. An example is shown in FIG. 24. As illustrated, in this example, the notches 3b are slightly inclined with respect to the optical axis of a lens 4. This structure also facilitates pick up the Patrone 7 by the fingers.

Figure 14:
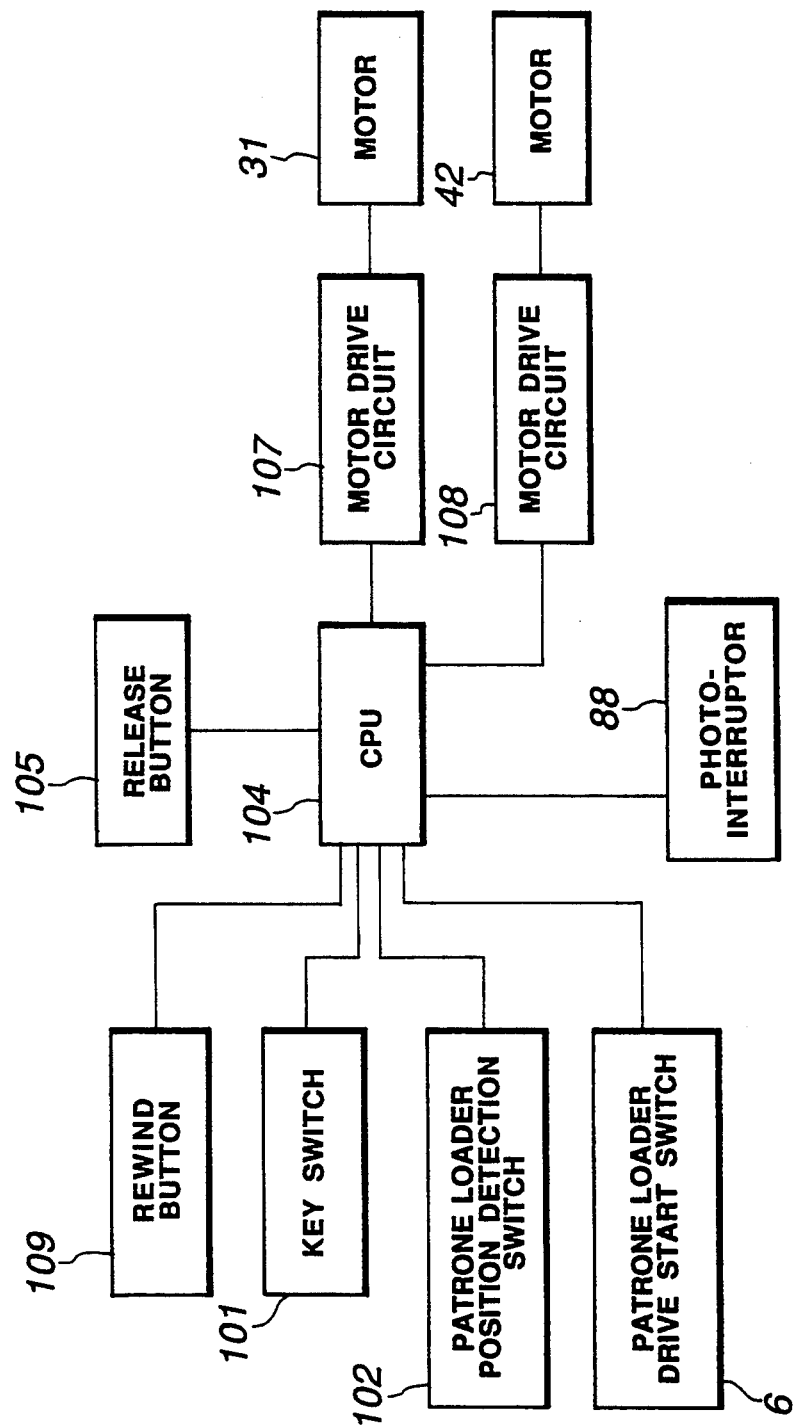
FIG. 14 is a block diagram of a camera to which the film loader of the first embodiment applies.

FIG. 14 is a block diagram showing drive circuits of a camera to which a film loader of this embodiment can apply.

As illustrated, a CPU 104 Is connected with a rewind button 109, a key switch 101, a Patrone loader position detection switch 102, a Patrone loader drive start switch 6, a release button 105, a photo-interruptor 88, a motor drive circuit 107 for charging a mirror charge or a shutter, or loading film, and a motor drive circuit 108 for auto-loading respectively. The CPU 104 inputs signals from these components or controls the components. Then, the motor drive circuit 107 drives a motor 31, and the motor drive circuit 108 drives a motor 42.

Figure 15:
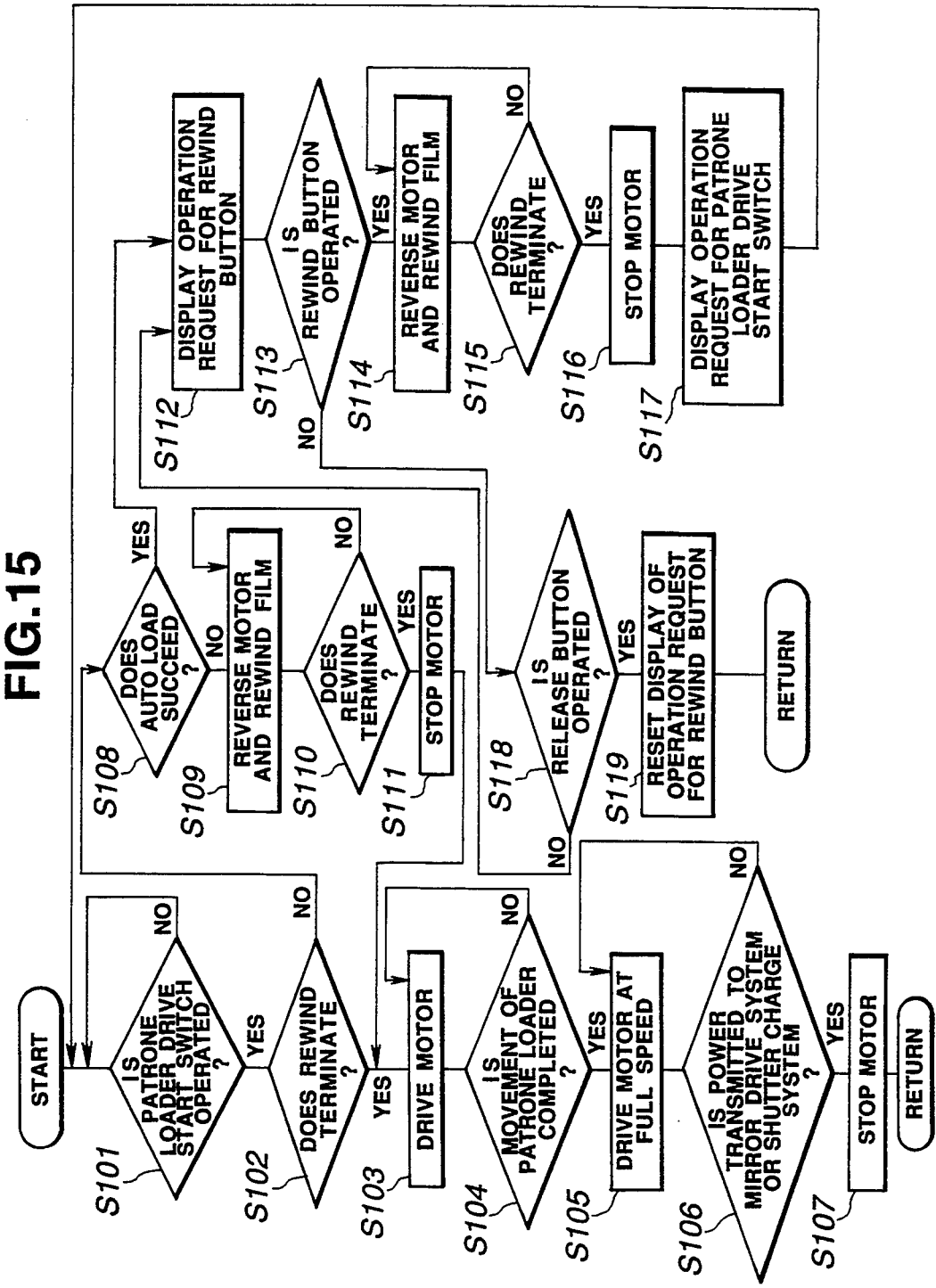
FIG. 15 is a flowchart showing the operations for film loading including film take-out in a camera to which the film loader of the first embodiment applies.
Figure 16:
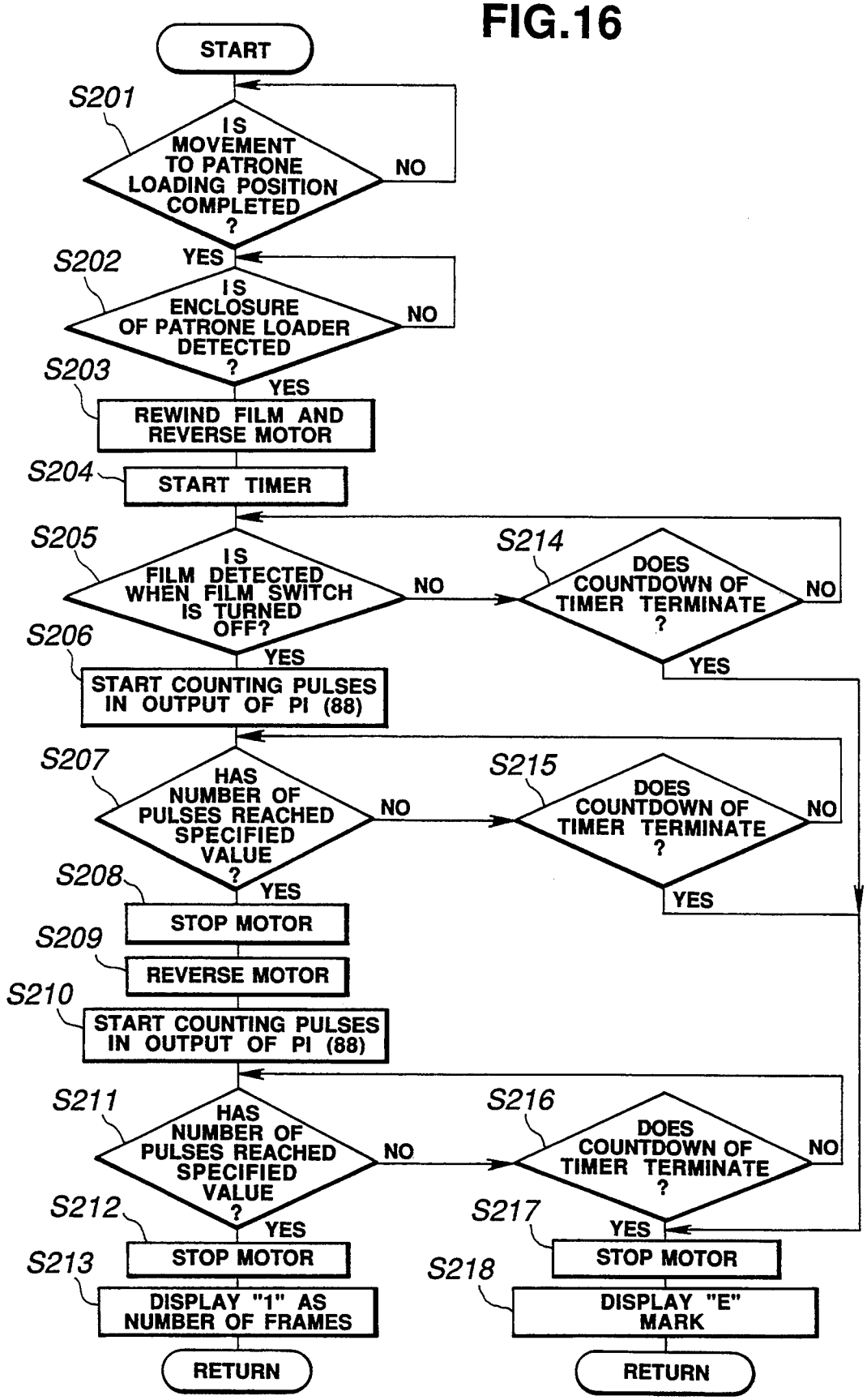
FIG. 16 is a flowchart showing the operations for auto loading in a camera to which the film loader of the first embodiment applies.

FIGS. 15 and 16 are flowcharts showing the operations for film loading and those for auto-loading for a camera having the foregoing construction.

First, referring to FIG. 15, the operations for film loading including an operation for taking out exposed film will be described.

When the Patrone loader drive start switch 6 is operated at a step S101, it is determined at a step S102 whether rewind has terminated. If rewind has terminated, the CPU 104 (See FIG. 14) outputs a motor drive signal to the motor drive circuit 107. The motor 31 rotates in the arrow-M direction in FIG. 10 (step S103).

When rewind has terminated, an epicyclic gear 52 is located at a position 52d in FIG. 12. With the rotation in the arrow-M direction of the motor 31, the epicyclic gear 52 revolves from the position 52d to a position 52c, and engages with a gear 56. Thus, the driving force of the motor 31 is transmitted to a key 38, whereby the key 38 and a claw 1d are disengaged from each other.

When the key 38 and claw 1d are disengaged from each other, a Patrone loader 2 moves a little from a storage position to a Patrone loading position due to the pressing force of a spring 2e. Then, the transmission system from a gear 62 to the key 38 is released, a rack 2d is engaged with the gear 62, and the rotation driving force of the motor 31 is transmitted to the Patrone loader 2. The driving force of the motor 31 causes the Patrone loader 2 to move to the Patrone loading position.

At this time, the motor 31 is driven in a specific duty cycle for the reason described previously. In this embodiment, the motor 31 is driven in a specific duty cycle to restrict an output of the motor 31. Alternatively, a circuit for converting voltage may be installed or a resistor may be inserted, thus restricting a current value.

At a step S104, a pattern 215b and a ground pattern GND on a substrate 215 (See FIG. 11) of a Patrone loader position detection switch 102 conduct mutually, and then the completion of movement to the Patrone loading position is detected.

When the completion of movement is detected at the step S104, the motor 31 is switched to a full-speed drive mode (duty 100%) at a step S105. Switching the motor 31 to the full-speed drive mode allows an epicyclic gear 52 to revolve and move to a position indicated with alphanumeric characters 52a in FIG. 12. Then, the epicyclic gear 52 engages with a gear 53. The driving force of the motor 31 is transmitted to the gear 53. Then, a mirror driving system and a shutter charging system are driven.

When it is detected at a step S106 that the mirror driving system and shutter charging system are actuated, the motor 31 is stopped at a step S107. Movement Completed is stored in a CPU 104.

In a lens-shutter type camera not having a mirror, an operation detection switch may be provided for a lever 58 (See FIG. 10), and a motor may be stopped with an output of the switch.

After an exposed film is taken out, if photography is continued further, new film is put in the Patrone loader 2. If photography is not continued, the Patrone loader 2 without film is pushed from the Patrone loading position to the storage position. Then, the key 38 engages with the claw 1d to lock the Patrone loader 2. In the course of the engagement, when the key 38 overpasses the claw 1d, the key 38 moves in an arrow-X direction in FIG. 10. Thereby, a key switch 101 changes its state from off through on to off.

When the pattern 215a and ground pattern GND on the substrate 215 conduct mutually, it is detected that the Patrone loader 2 is at the storage position. When these signals are fed to the CPU 104 and Movement Completed is existent in the CPU 104, the CPU 104 outputs a motor drive signal to the motor drive circuit 108. Consequently, auto-loading of film 8 is executed.

It film rewind has not terminated at the step S102, it is determined at a step S108 whether auto-loading succeeds. If auto-loading fails, no film may have been put in a camera body or winding film about a spool may have failed. In either case, the subsequent operations are the same.

If Auto-loading Fails has been stored in the CPU 104 at the step S108, the CPU 104 outputs a Film Rewind signal to the motor drive circuit 107. With this signal, the motor 31 is rotated in the opposite direction of the arrow-M direction (step S109). Then, the epicyclic gear 52 revolves to engage with a gear 55. The rotation driving force of the motor 31 is transmitted to a pawl 69, which engages with a spool in a Patrone, and film rewind is performed. At a step S110, when the film switch 110 (See FIG. 13) changes its state from off to on and rewind termination is detected, the motor 31 is braked to stop.

Instead of the film switch 110, a photo-interruptor 88 (See FIGS. 13 and 14) may be employed. Specifically, the motor 31 may be stopped in accordance with a pulse signal the photo-interruptor 88 outputs with the movement of film.

The operations after the step S111 are identical to the aforesaid operations performed after rewind is completed. However, the drive of the Patrone loader 2 is started although the Patrone loader drive switch 6 is not operated again.

When auto-loading fails, the film is rewound. This is because if winding film about a spool fails, a considerably long portion of the film may have been pulled out. The film is rewound temporarily so as not to disable film take-out or re-loading. Then, the Patrone loader 2 is moved from the storage position to the Patrone loading position.

Next, operations for taking out a film in the middle of photography will be described.

If Auto-loading Succeeds has been stored in the CPU 104 at the step S108, a request for operating the rewind button 109 appears on a liquid crystal display, which is not shown, at a step S112.

The Patrone loader drive start switch 6 may be operated to execute a series of operations from film rewind to movement of the Patrone loader. In this embodiment, an operation request for the rewind button 109 is displayed in an effort to prevent an incorrect switch operation.

After the step S112, it is determined at a step S113 whether the rewind button 109 is operated. If the rewind button 109 is operated, the motor 31 is driven to execute film rewind at a step S114. It it is determined at a step S115 that the state of the film switch 110 is changed from off to on and rewind terminates, the motor 31 is stopped (step S116). At a step S117, a request for operating the Patrone loader drive start switch appears on the display which is not shown.

At a step S118, if the rewind button 109 is not operated but the release button 105 is operated, the foregoing operation request for the rewind button 109 is not displayed (step S119).

Next, operations for auto-loading will be described with reference to FIG. 16.

When the Movement of the Patrone loader 2 to the Patrone loading position Completed has been stored in the CPU 104 (step S201), the pattern 215a and ground pattern GND on the substrate of the Patrone loader position detection switch 102 conduct mutually, and the state of the key switch 101 is changed from off through on to off. If it is detected (step S202) that the key 38 operates and the Patrone loader is stored, the CPU 104 outputs a motor drive signal to the motor drive circuit 108. The motor 42 (See FIGS. 13 and 14) is driven and film auto-loading is executed.

At a step S203, the motor 42 is rotated in the opposite direction of an arrow-Y direction in FIG. 13. Then, an epicyclic gear 74 revolves to engage with a gear 77. Thereby, the rotation driving force of the motor 42 is transmitted to the gear 77. Then, a sprocket 79 and a sprocket 85 rotate. With claws 79c, 79d, and 85c of the sprockets, which are engaging with film perforations, film is fed toward a spool.

When film is fed, the state of the film switch 110 is changed from off to on at a step S204. The timing that the film switch 110 is turned off at step S205 is used as a reference. Then, pulses supplied with movement of the film are counted (step S206). When the count value comes to a certain value (step S207), the motor is stopped (step S208). Thereby, the leader of film 8 is fed to a position at which the leader can wind about a spool 32.

Next, the motor 42 is rotated in the arrow-Y direction in FIG. 13 (step S209). The epicyclic gear 74 revolves and moves to a position at which the epicyclic gear 74 engages with the spool 32b. Then, the rotation driving force of the motor 42 is transmitted to the spool 32. When the spool 32 rotates, spool claws 32a engage with film perforations. Then, the film 8 is fed by the spool 32 and wound about the spool 32.

The quantity of feeding the film 8 at this time is measured as a quantity of rotation of a sprocket 89 by counting output pulses of the photo-interruptor 88 (step S210). When the number of pulses comes to a certain value (step S211), the motor 42 is braked to stop (step S212). The number of frames, 1, appears on the display which is not shown (step S213). Consequently, preparations for photography are completed.

Simultaneously with the start of auto-loading at the step S203, countdown of a timer is started. If auto-loading is not completed after a certain period of time has elapsed at each of steps S214, S215, and S216, the motor is stopped (step S217). A mark E appears on the display (step S218) and Auto-loading Failure is notified to a photographer.

In this embodiment, the Patrone loader drive start switch 6 is used to drive the Patrone loader. Alternatively, interlocked with termination of rewind actuated using the Patrone loader drive start switch 7, the Patrone loader may be driven.

In this embodiment, it is determined at the step S102 in FIG. 15 whether rewind terminates. Alternatively, the film switch 110 is used to determine the presence or absence of film. Then, if film is absent, the operation of the step S103 may be performed. If film is present, the operation of the step S108 may be performed.

Figure 2:
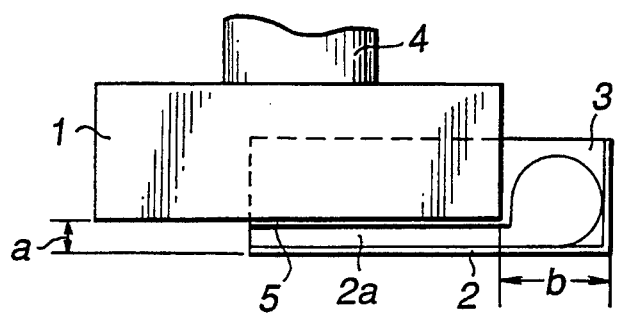
FIG. 2 is a plan view showing the dimensional relationship between a Patrone loader and a camera body when the Patrone loader shown in FIG. 1 is loaded into the camera body.

When the aforesaid film loader of the first embodiment applies to a camera, as shown in FIG. 2, a Patrone loader 2 projects, at a Patrone loading position, by a dimension a behind a camera body 1 and by a dimension b rightward.

Figure 3:
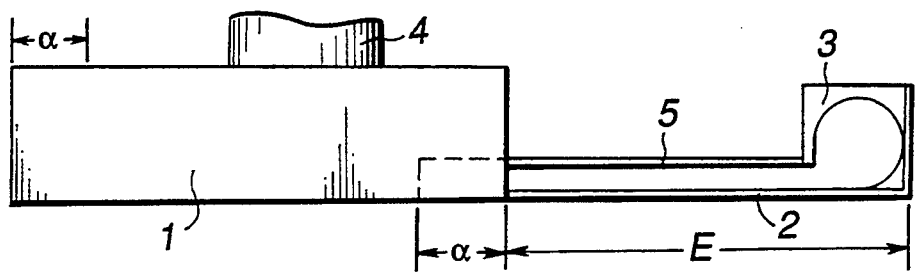
FIG. 3 is a plan view showing the dimensional relationship between a conventional Patrone loader and a camera body for comparison with the dimensions of the first embodiment shown in FIG. 2.

In a conventional camera, shown in FIG. 3, in which a Patrone loader 2 is slided laterally, the Patrone loader 2 projects by a dimension E rightward at a Patrone loading position. To slide the Patrone loader 2 to the Patrone loading position, a guide distance of a dimension $\alpha$ is required. This leads to an increase of $\alpha$ in the length of the camera body 1 in the sliding direction. As described above, in the camera to which the film loader of this embodiment applies, the guide distance of $\alpha$ becomes unnecessary. Therefore, the length of the camera in the direction perpendicular to the optical axis of a lens (sideways width of the camera) can be diminished. As a result, downsizing of the camera body 1 is realized.

Figure 4:
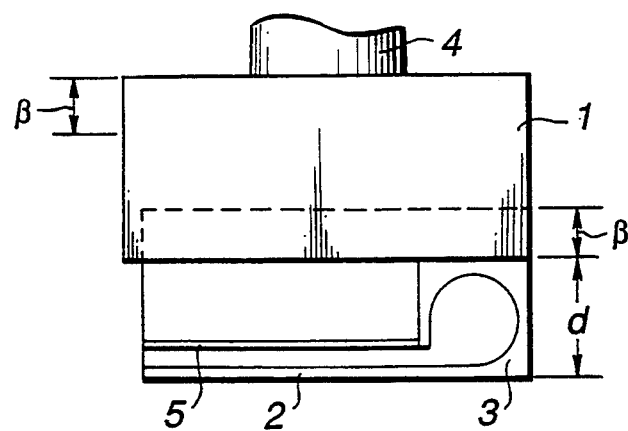
FIG. 4 is a plan view showing the dimensional relationship between another conventional Patrone loader and a camera body for comparison with the dimensions of the first embodiment shown in FIG. 2.

Similarly, in a conventional camera in which such a Patrone loader 2 as that shown in FIG. 4 is slided backward, the Patrone loader 2 projects by a dimension d backward in FIG. 4 at a Patrone loading position. To slide the Patrone loader 2 to the Patrone loading position, a guide distance of a dimension $\beta$ is required. This leads to an increase, $\beta$, in the length of a camera body 1 in the sliding direction. As described above, in a camera to which the film loader of this embodiment applies, the guide distance of $\beta$ is unnecessary. Therefore, the length of the camera body along the optical axis of a lens can be diminished. Consequently downsizing of the camera body 1 is realized.

Figure 17:
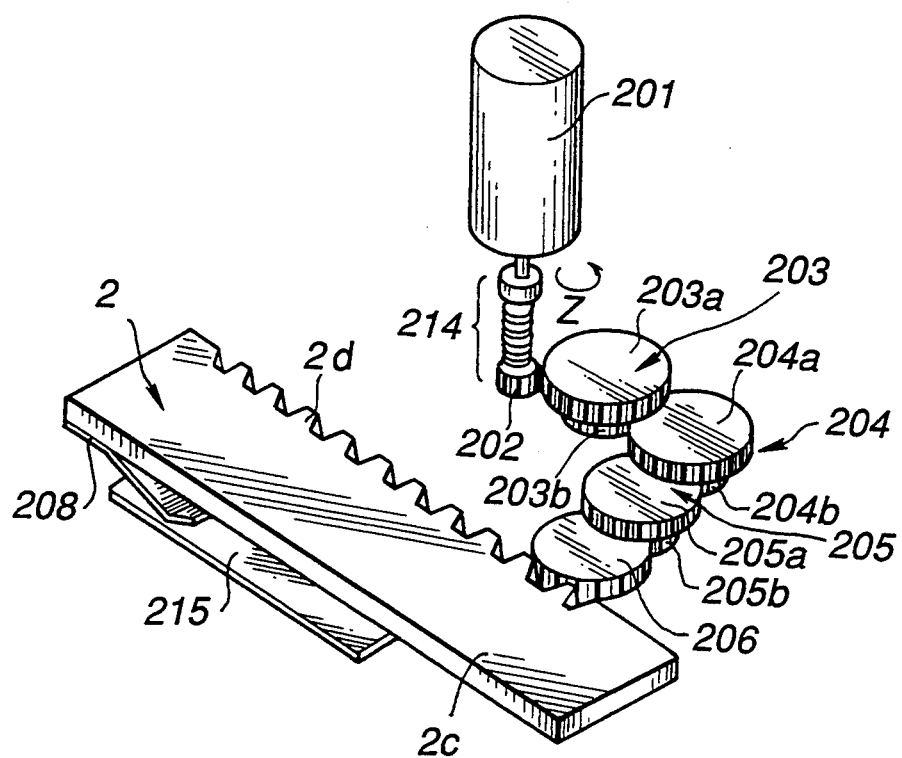
FIG. 17 is an oblique perspective view showing a driving means for a Patrone loader in a film loader representing the second embodiment of the present invention.

FIG. 17 is an oblique perspective view showing a driving means for a Patrone loader in a film loader representing the second embodiment of the present invention.

This second embodiment differs from the first embodiment in the driving means for a Patrone loader 2. In short, a dedicated motor is used to drive the Patrone loader 2. The movement of the Patrone loader 2 from a storage position to a Patrone loading position, and the movement from the Patrone loading position to the storage position are motor-driven.

A motor 201 is attached to a base V which is not shown. The base V is fixed to a camera body. The motor 201 has a pinion gear 202 with a slip clutch 214 between. The rotation driving force of the motor 201 is transmitted due only to the frictional force of the slip clutch 214.

A gear 203 is supported by the base V so as to be rotatable. A large-diameter gear 203a is engaging with the pinion gear 202.

A gear 204 is supported by the base V so as to be rotatable. A large-diameter gear 204a is engaging with a small-diameter gear 203b.

A gear 205 is supported by the base V so as to be rotatable. A large-diameter gear 205a is engaging with a small-diameter gear 204b.

A gear 206 is supported by the base V so as to be rotatable. Gear 206 is engaging with a small-diameter gear 205b.

A rack 2d is formed on one side surface of a bottom 2c of the Patrone loader 2, and engaging with the gear 206. The Patrone loader 2 is provided with a chip 208. The chip 208 slides on a substrate 215 with the movement of the Patrone loader 2. On the substrate 215, patterns as shown in FIG. 11 are formed. The patterns enable detection of a position of the Patrone loader 2.

Figure 18:
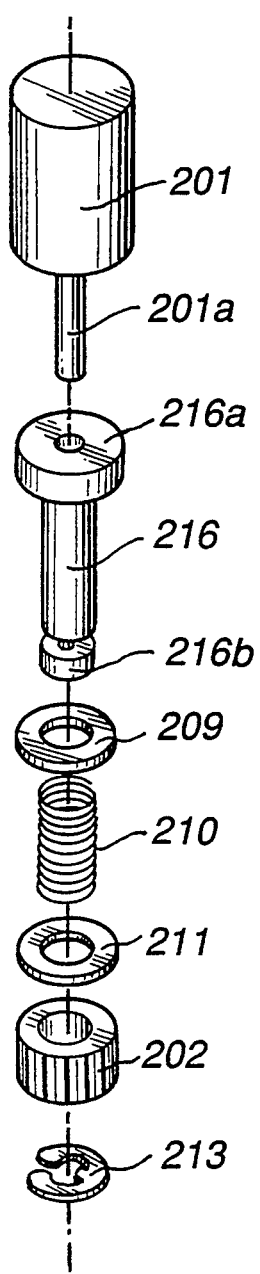
FIG. 18 is an exploded oblique perspective view showing a structure of a slip clutch in the second embodiment.

FIG. 18 is an exploded oblique perspective view showing a structure of the slip clutch 214 in the second embodiment.

An axis 216 is fixed to an output axis 201a of a motor 201 so as to rotate as part of the output axis 201a. The axis 216 is provided with a collar 216a having a surface for receiving a coil spring 210. The axis 216 serves as a rotation axis for the pinion gear 202. The coil spring 210 is interposed between the pinion gear 202 and the collar 216a of the axis 216. A washer 209 is placed between the coil spring 210 and the collar 216a of the axis 216, and a washer 211 is placed between the coil spring 210 and the pinion gear 202.

The washer 209, coil spring 210, washer 211, and pinion gear 202 are united with the axis 216 using an E ring 213. The coil spring 210 is pressed in a stretching direction. Frictional force derived from the pressing force connects the pinion gear 202 with the axis 216. That is to say, when the frictional force provides a large force (rotation driving force), the large force is applied to the pinion gear 202. Consequently, slip occurs between the axis 216 and the pinion gear 202.

Next, the operations of the second embodiment having the aforesaid construction will be described.

After rewind terminates, when the Patrone loader drive start switch 6 (See FIG. 14) is operated, the motor 201 is rotated in an arrow-Z direction in FIG. 17 by a drive circuit. The rotation driving force of the motor 201 is transmitted sequentially from the pinion gear 202 through the gears 203, 204, 205, and 206, to the rack 2d. Consequently, the Patrone loader 2 is moved toward the Patrone loading position.

At this time, even if the Patrone loader 2 is pressed by a hand and locked, the slip clutch 214 works to prevent transmission of a quantity exceeding a certain value of driving force of the motor 201. Therefore, no gear will be broken. After the Patrone loader 2 has moved to the Patrone loading position, when the chip 208 causes the pattern 215b (See FIG. 11) and the ground pattern GND on the substrate to conduct mutually, the completion of movement of the Patrone loader 2 is detected. Then, the motor 201 is stopped.

Thereafter, a Patrone with exposed film encased is taken out from the Patrone loader 2. When photography is continued, new film is loaded. When photography is not continued, the Patrone loader is pushed slightly with a hand as it is, or the Patrone loader drive start switch 6 is operated. At this time, when the Patrone loader 2 is pushed, the conduction between the pattern 215b and ground pattern GND on the substrate 215 is discontinued. Otherwise, the conduction between the pattern 215b and ground pattern GND on the substrate 215 is detected. Then, if it is also detected that the Patrone loader drive start switch 6 has been operated, the motor 201 is rotated in the opposite direction of the arrow-Z direction in FIG. 17.

Thereby, the Patrone loader 2 is driven from the Patrone loading position to the storage position. Then, the pattern 215a and ground pattern GND on the substrate 215 conduct mutually. When it is detected that the movement to the storage position is completed, the motor 201 is stopped and auto-loading Is executed. Auto-loading is identical to that in the first embodiment. When auto-loading fails or photography is in progress, after film is rewound, the Patrone loader 2 is driven by operating the Patrone loader drive start switch 6 as described in the first embodiment.

In the present invention, It will be apparent that a wide range of different embodiments can be formed on the basis of the invention without departing from the spirit and scope of the invention. This invention is not restricted to any specific embodiment but is limited only by the appended claims.

What is claimed is:

1. A film loader, comprising:
   a Patrone housing that linearly moves freely between a storage position, at which the Patrone housing is stored in a camera body, and a projecting position, at which the Patrone housing projects outwardly and away form a side face of said camera body and is displaced a distance from said side face which is measured along a line perpendicular to an optical axis of the camera body enabling a Patrone to be inserted therein; and
   a leader housing that is formed as part of said Patrone housing, and linearly moves between a storage position, at which the leader housing is stored in said camera body, and a projecting position, at which the leader housing projects rearwardly from a rear face of said camera body and is displaced by a distance measured along a second line parallel to said optical axis for receiving a film leader extending from a Patrone.

2. A film loader according to claim 1, wherein said Patrone housing has notches on a side wall of an opening oriented in the direction of loading a Patrone.

3. A film loader according to claim 2, wherein said notches have tapered portions whose widths become narrower from the opening through which a Patrone is inserted toward a position at which the insertion is completed.

4. A film loader, comprising:
   a Patrone housing that moves freely between a storage position, at which the Patrone housing is stored in a camera body, and a projecting position, at which the Patrone housing projects from a side face of said camera body enabling a Patrone to be inserted therein;
   a leader housing that is formed as part of said Patrone chamber, and is movable between a storage position, at which the leader housing is stored in said camera body, and a projecting position, at which the leader housing projects from a rear face of said camera body for receiving a film leader pulled out of a Patrone;
   a mask means located on a side of a surface of film to be exposed when the film is stored in said leader housing, and defines a picture size;
   a pressure plate that ensures flatness for film in cooperation with said mask means; and
   a withdrawing means that withdraws said mask means from said pressure plate when said Patrone housing and said leader housing lie at their projecting positions at which said Patrone housing and said leader housing project from said camera body.

5. A film loader according to claim 4, wherein said withdrawing means comprises:
an axis means for supporting said mask means in such a manner that said mask means can rotate;
a pressing means that presses said mask means in a direction away from said pressure plate; and
a stopper means that defines a withdrawal position of said mask means.

6. A film loader according to claim 5, wherein said mask means has an elongated hole, which allows said mask means to move from said pressure plate along an optical axis of a lens, at its end, and said axis means supports said mask means in such a manner that said mask means can rotate and move within said elongated hole.

7. A film loader according to claim 4, wherein said Patrone housing has notches on the side wall of an opening oriented in the direction of loading a Patrone that is inserted along a film spool to facilitate removal of a Patrone by an operator.

8. A film loader according to claim 7, wherein said notches have tapered portions whose widths become narrower from an opening through which a Patrone is inserted toward a position at which the insertion is completed.

9. A film loader, comprising:
a Patrone housing that is located in a camera body and stores a Patrone;
a leader housing that is formed as part of said Patrone housing and stores a film leader pulled out of a Patrone; and
a moving means that moves said Patrone housing between a position at which said Patrone housing is stored in said camera body, and a projecting position at which said Patrone housing projects from a side face of said camera body enabling a Patrone to be inserted therein, that moves said leader housing between a position at which said leader housing is stored in said camera body, and a position at which said leader housing projects from a rear face of said camera chamber to receive a film leader pulled out of a Patrone.

10. A film loader according to claim 9, wherein said moving means comprises:
a driving source; and
a transmitting means that transmits a driving force of said driving source to said Patrone housing and to said leader housing.

11. A film loader according to claim 10, wherein said driving source is driven by an indicating means that indicates start of movement of said Patrone housing and said leader housing.

12. A film loader according to claim 9, wherein said Patrone housing has notches on a side wall of an opening oriented in a direction of loading a Patrone to facilitate Patrone removal.

13. A film loader according to claim 12, wherein said notches have tapered portions whose widths become narrower from an opening through which a Patrone is inserted toward a position at which the insertion is completed.

14. A camera having a film loader, comprising:
a film loading member made up of a Patrone housing located in a camera body for receiving a Patrone inserted along a direction of a film spool, and a leader housing that is formed as part of said Patrone housing for receiving a film leader pulled out of said Patrone;
a driving source for generating a driving force for moving said film loading member to a specified position;
a transmitting means that transmits a driving force of said driving source to said film loading member;
an indicating means that indicates start of movement of said film loading member;
a position detecting means that detects the open or closed state of said film loading member; and
a control means for controlling said driving source in accordance with a signal sent from said indicating means and a signal sent from said position detecting means in such a manner that said film loading member can move freely between a storage position, at which said film loading member can be stored in said camera body, and a projecting position, at which a Patrone can be inserted into said Patrone housing and a film leader pulled out of said Patrone can be stored in said leader housing.

15. A film loader according to claim 14, wherein said position detection means comprises:
a contact means attached to said film loading member; and
a substrate that is located in a camera body and has a plurality of electrodes selectively connected to said contact means.

16. A film loader according to claim 14, wherein said transmitting means comprises:
an epicyclic mechanism including at least an epicyclic gear for selectively transmitting driving force of said driving source to one of two gears and an epicyclic lever for controlling revolution of said epicyclic gear;
a first relay gear means located in the middle of the orbit of revolution of said epicyclic gear between said gears, and made up of two gears which engage with said epicyclic gear;
a stopping means that when said epicyclic gear is revolving between said gears, stops said epicyclic lever to temporarily stop revolution of said epicyclic gear, and causes said epicyclic gear to selectively engage with said two gears of said first relay gear means in the forward and reverse directions of revolution respectively;
a first pressing means that presses said stopping means toward a position at which said epicyclic gear engages with said two gears of said first relay gear means;
a second relay gear means engaging with said first relay gear means;
a holding means for holding said film loading member at a specified position in a camera body;
a release means located in said film loading member for releasing the holding of said holding means using a driving force derived from said second relay gear means;
a second pressing means that presses said film loading member in such a direction in a camera body that said film loading member engages with said second relay gear means;
a moving gear means located in said film loading member, and that when the hold between said film loading member and a camera body is released by said releasing means, engages with said second relay gear means to move said film loading member to a film loading position.

17. A film loader according to claim 16, wherein said releasing means for releasing the holding of said film loading member comprises:
- at least one gear for transmitting driving force derived from said second relay gear means;
- an angle defining means that limits a rotation angle of said gear; and
- a lever means that is interlocked with the rotation of said one gear to release the engagement with said holding means.

18. A film loader according to claim 17, wherein said rotation angle defining means for said gear comprises stopper means for causing said gear to rotate between predetermined limits including:
- a first position at which the rotation of said first and second relay gear means and of said epicyclic gear are restricted to convert the rotation of said epicyclic gear into revolution, and the revolving force is used to move said epicyclic gear against the pressing force of said first pressing means; and
- a second position at which the rotating force derived from said relay gear means is transmitted to said lever means via said one gear so that said film loading member and a camera body will be disengaged from each other.

19. A film loader according to claim 16, wherein said control means controls in such a manner that when said moving gear means engages with said second relay gear means to move said film loading member to a film loading position, voltage of said driving means will be set to a voltage value that disables said epicyclic gear to release stoppage of said stopping means.

20. A film loader according to claim 14, wherein said Patrone housing has notches on a side wall of an opening oriented in the direction of loading a Patrone.

21. A film loader according to claim 20, wherein said notches have tapered portions whose widths become narrower from an opening through which a Patrone is inserted toward a position at which the insertion is completed.

22. A camera having a film loader, comprising:
- an electric driving means;
- a film loading section for storing a Patrone and a film extending out of the Patrone;
- an epicyclic gear means for selecting one of a plurality of means to be driven and driving the selected one of said plurality of means using a driving force of said electric driving means;
- a holding means that holds said film loading section in a camera body;
- a releasing means that receives driving force from said electric driving means and releases said holding means;
- a stopping means that stops revolution of said epicyclic gear means;
- a moving means that receives a driving force from said electric driving means and moves said film loading section to a position outside a camera body; and
- a control means that when said epicyclic gear means is stopped by said stopping means while receiving driving force from said electric driving means, uses said releasing means to release said holding means, and then transmits the driving force to said moving means to move said film loading means outside the camera body.

23. A film loader according to claim 22, wherein said stopping means comprises:
- a stopping member located substantially in a middle position of an orbit of revolution of said epicyclic gear means, and causes said epicyclic gear to engage with a first relay gear means made up of two gears, which selectively engage with said epicyclic gear means, in the forward and reverse directions of revolution of said epicyclic gear means respectively; and
- a first pressing means that presses said stopping member to a position at which said epicyclic gear means engages with said two gears of said first relay gear means.

24. A film loader according to claim 23, wherein said moving means comprises:
- a second relay gear means engaging with said first relay gear means; and
- a moving gear means located in said film loading section, and that when the hold between said film loading section and a camera body is released by said releasing means, engages with said second relay gear means to move said film loading section to a film loading position.

25. A film loader according to claim 24, wherein said releasing means that releases the hold of said film loading section comprises:
- at least one gear for transmitting driving force from said second relay gear means;
- an angle defining means that limits a rotation angle of said gear; and
- a lever means that is interlocked with the rotation of said one gear to release the engagement with said holding means.

26. A film loader according to claim 25, wherein said rotation angle defining means for said one gear is a stopper means causing said gear to rotate between:
- a first position at which the rotation of said first and second relay gear means and of said epicyclic gear are restricted to covert a rotation of said epicyclic gear into revolution, and a revolving force is used to move said epicyclic gear against the pressing force of said pressing means; and
- a second position at which a rotating force derived from said first relay gear means is transmitted to said lever means via said one gear so that said film loading member and a camera body will be disengaged from each other.

27. A film loader according to claim 22, wherein said plurality of means to be driven include:
- a means for driving a mirror;
- a means for charging a shutter; and
- a rewinding means.

28. A film loader for a camera, comprising:
- a film loading section that can load a Patrone along an axis thereof, store a Patrone and a film coming out of the Patrone, and move obliquely to a position behind a camera body; said film loading section being stored in said camera body when a Patrone is inserted therein, and projecting obliquely behind said camera body when a Patrone is removed therefrom; and
- an electric driving means that drives said film loading section in a direction outside of said camera body.

29. A film loader according to claim 28, wherein said electric driving means includes an electric motor.

30. A film loader for a camera, comprising:
- a film loading means for loading a Patrone along an axis thereof, store a Patrone and a film extending out of the Patrone, and move obliquely in a direction behind said camera body; said film loading means being stored in said camera body when a Patrone is inserted therein, and projecting obliquely behind said camera body when a Patrone is removed therefrom; and an electric driving means for driving said film loading means.

31. A film loader according to claim 30, wherein said film loading means is moved outside a camera body by said electric driving means.

32. A film loader according to claim 30, wherein said film loading means is moved freely by said electric driving means between a storage position in a camera body and a Patrone removal position.

33. A film loader for a camera, comprising:
an electric driving means for selectively driving one section to be driven among a plurality of sections to be driven;
a rewinding means that stores an exposed portion of film in a Patrone and outputs a Rewind Completed signal at the completion of a rewinding;
a camera body housing said electric driving means;
a Patrone loading means that permits insertion of a Patrone and a film coming out of the Patrone along an axis thereof, can move obliquely toward a position behind said camera body, is stored in said camera body during photography, and moves obliquely behind said camera body to project from said camera body during replacement of a Patrone;
an ejecting means that moves said Patrone loading means obliquely behind said camera body to project said Patrone loading means from said camera body;
a locking means for holding said Patrone loading means in said camera body;
a lock releasing means receiving driving force from said electric driving means for releasing the locked state in which said Patrone loading means is held in said camera body by said locking means;
a rewind starting means for outputting a Rewind Start signal;
a control means that when receiving an output of said rewind starting means, instructs said electric driving means to select a rewinding means which is one of the plurality of sections to be driven, and uses the driving force to rewind film, that when receiving a Rewind Completed signal, instructs said electric driving means to select a lock releasing means which is one of the plurality of sections to be driven, and uses the driving force to release said locking means, and that instructs said electric driving means to select an ejecting means which is one of the plurality of sections to be driven, and uses the driving force to project said Patrone loading means out of said camera body.

34. A film loader for a camera, comprising:
a film loading means for loading a Patrone along an axis thereof, and movable obliquely to a position behind a camera body; said film loading means being stored in said camera body when a Patrone is inserted therein, and projecting obliquely behind said camera body when a Patrone is removed;
a locking means for holding said Patrone loading means in a camera body;
a lock releasing means for releasing the holding of said locking means; and a driving means that releases the holding of said locking means and drives said film loading means in a direction outside of said camera body.

35. A camera, comprising:
a film loading means for exposing an opening for loading film to a position outside of a camera;
a film rewinding means that rewinds film into a Patrone;
a locking means for holding said film loading means in a camera body;
a releasing means for releasing the holding of said locking means;
a driving means for releasing the holding of said locking means and drives said film loading means towards a position outside a camera body;
a rewind memory means for storing a Film Rewind Completed state;
an operation switch for outputting a signal for starting drive of a driving means; and
a control means that receives an output from said operation switch, that when said rewind memory means stores a Rewind Completed state, enables drive of said driving means, and that when the Film Rewind Completed state is not set, disables drive of said driving means.

36. A camera, comprising:
a film loading means for exposing an opening for loading a film to a position outside of a camera;
a film detecting means for detecting a presence or absence of film in a film passage;
a locking means for holding said film loading means in a camera body;
a releasing means for releasing the holding of said locking means;
a driving means which drives said film loading means toward a position outside a camera body;
an operation switch for outputting a signal for starting drive of said driving means; and
a control means that when said operation switch provides an output, if said film detecting means detects a presence of a film in the film passage, disables drive of said driving means.

37. A camera, comprising:
a film loading means for exposing an opening for loading a film to a position outside of a camera;
a film detecting means for detecting presence or absence of film in a film passage;
a locking means for holding said film loading means in a camera body;
a releasing means for releasing the holding of said locking means;
a rewinding means for rewinding a film in a camera body into a Patrone;
a driving means for releasing the holding of said locking means and driving said film loading means;
an operation switch for outputting a signal for starting drive of said driving means; and
a control means that when said operation switch provides an output, if said film detecting means detects a presence of film in the film passage, drives said rewinding means to rewind film into a Patrone, and then drives said driving means to move said film loading means.

38. A camera, comprising:
a film loading opening means for replacing film;
a locking means for preventing said film loading opening means from opening; and a lock releasing means that releases the lock of said locking means responsive to an electric drive.

39. A camera according to claim 38, wherein said lock releasing means includes an electric motor.

40. A camera comprising:
a camera body;
a Patrone housing movable between an installed position contained within a camera body and a film loading position projecting away from the camera body;
said Patrone housing being positioned to receive a Patrone when in the film loading position;
a leader housing integral with said Patrone housing for receiving a film leader extending from a Patrone;
guide means in said camera body for guiding the Patrone and leader housings to move along a substantially linear guide path which is diagonally aligned relative to an optical axis of the camera whereby the leader housing is positioned a spaced distance rearward from a rear surface of the camera body and the Patrone housing is positioned a spaced distance sideward away from a side of the camera body adjacent to said rear surface.

41. A camera comprising:
a camera body;
a Patrone housing movable between an installed position contained within a camera body and a film loading position projecting away from the camera body;
said Patrone housing being positioned to receive a Patrone when in the film loading position;
a leader housing integral with said Patrone housing for receiving a film leader extending from a Patrone;
guide means in said camera body for guiding the Patrone and leader housings to move along substantially linear guide path which is diagonally aligned relative to an optical axis of the camera whereby the leader housing is positioned a spaced distance rearward from a rear surface of the camera body and the Patrone housing is positioned a spaced distance sideward away from a side of the Camera body adjacent to said rear surface;
said leader housing further comprising:
means for enlarging a region for receiving a film leader strip when the leader housing is displaced from the camera body; and
means in said camera body for reducing the region receiving a film strip when the leader housing is installed into the camera body.

42. A camera according to claim 41 wherein in said leader housing further comprises a mask member pivotally connected to the leader housing and swingable between a first position by said means for enlarging for increasing the region for receiving a film leader strip and a second position by said means for reducing for substantially maintaining a film strip extending across said member in a flat condition.

43. A camera according to claim 42 wherein said mask member further comprises a mask frame for limiting the size of an image focused on a film strip behind said movable member by a camera taking lens.

44. A camera comprising:
a camera body;
a Patrone housing movable between an installed position contained within a camera body and a film loading position projecting away from the camera body;
said Patrone housing being positioned to receive a Patrone when in the film loading position;
a leader housing integral with said Patrone housing for receiving a film leader extending from a Patrone;
guide means in said camera body for guiding the Patrone and leader housing to move along a substantially linear guide path which is diagonally aligned relative to an optical axis of the camera whereby the leader housing is positioned a spaced distance rearward from a rear surface of the camera body and the Patrone housing is positioned a spaced distance sideward away from a side of the camera body adjacent to said rear surface; and
electric drive means for moving said Patrone housing and leader housing between said installed and loading positions.

45. A camera according to claim 44 further comprising:
switch means for controlling the operation of said electric drive means.

46. A camera according to claim 44 further comprising:
a take-up spool provided in said camera body; and
means for automatically advancing a film strip from the leader housing and winding said film strip about said take-up spool when the Patrone housing and leader housing are moved to the installed position in the camera body.

47. A film loader according to claim 1, wherein a central axis of a Patrone in said patrone housing and a plane of a film leader said leader housing remain parallel to their orientation in said storage position when they are moved to their respective projecting positions.

48. A camera according to claim 40, wherein a central axis of a Patrone and a plane of a film respectively provided in said Patrone and leader housings remain parallel to their orientation in said installed position when they are moved from said installed position to said film loading position.

* * * * *